(12) United States Patent
Tanaka et al.

(10) Patent No.: US 11,198,775 B2
(45) Date of Patent: Dec. 14, 2021

(54) RESIN COMPOSITION AND RESIN MOLDED ARTICLE

(71) Applicant: Eastman Chemical Company, Kingsport, TN (US)

(72) Inventors: Ryo Tanaka, Minamiashigara (JP); Kana Miyazaki, Minamiashigara (JP); Kenji Yao, Minamiashigara (JP)

(73) Assignee: Eastman Chemical Company, Kingsport, TN (US)

( * ) Notice: Subject to any disclaimer, the term of this patent is extended or adjusted under 35 U.S.C. 154(b) by 204 days.

(21) Appl. No.: 16/374,370

(22) Filed: Apr. 3, 2019

(65) Prior Publication Data

US 2020/0199331 A1 Jun. 25, 2020

(30) Foreign Application Priority Data

Dec. 20, 2018 (JP) .............................. JP2018-238801

(51) Int. Cl.
| | |
|---|---|
| *C08L 1/12* | (2006.01) |
| *C08K 5/13* | (2006.01) |
| *C08L 25/12* | (2006.01) |
| *C08L 25/06* | (2006.01) |
| *C08L 33/10* | (2006.01) |
| *C08L 67/00* | (2006.01) |
| *C08K 5/00* | (2006.01) |
| *C08K 5/11* | (2006.01) |
| *C08L 77/02* | (2006.01) |
| *C08L 23/02* | (2006.01) |
| *C08L 77/06* | (2006.01) |

(52) U.S. Cl.
CPC ............. *C08L 1/12* (2013.01); *C08K 5/0016* (2013.01); *C08K 5/11* (2013.01); *C08K 5/13* (2013.01); *C08L 23/02* (2013.01); *C08L 25/06* (2013.01); *C08L 25/12* (2013.01); *C08L 33/10* (2013.01); *C08L 67/00* (2013.01); *C08L 77/02* (2013.01); *C08L 77/06* (2013.01); *C08L 2205/035* (2013.01); *C08L 2205/22* (2013.01); *C08L 2207/324* (2013.01)

(58) Field of Classification Search
None
See application file for complete search history.

(56) References Cited

FOREIGN PATENT DOCUMENTS

| JP | 9-40875 A | 2/1997 |
|---|---|---|
| JP | 6323605 B1 | 5/2018 |

OTHER PUBLICATIONS

Luzinov, et al. "Ternary polymer blend with core-shell dispersed phases: effect of the core-forming polymer on phase morphology and mechanical properties", Polymer, 41, 7099-7109, 2000. (Year: 2000).*

* cited by examiner

*Primary Examiner* — Christopher M Rodd
(74) *Attorney, Agent, or Firm* — C Stuart Everett

(57) ABSTRACT

A resin composition includes a resin (A), a resin (B), and resin particles (C), and has a continuous phase containing the resin (A) and dispersed phases containing the resin (B), in which when a cross section of the resin composition along an extrusion direction in producing the resin composition is observed, an area circle equivalent diameter $d_{80}$, which is an area circle equivalent diameter corresponding to 80% from a small diameter side in a number cumulative distribution of area circle equivalent diameters of the dispersed phases, is 600 nm or less.

7 Claims, No Drawings

RESIN COMPOSITION AND RESIN MOLDED ARTICLE

CROSS-REFERENCE TO RELATED APPLICATIONS

This application is based on and claims a priority under 35 USC 119 from Japanese Patent Application No. 2018-238801 filed on Dec. 20, 2018.

BACKGROUND

Technical Field

The present disclosure relates to a resin composition and a resin molded article.

Related Art

JP-B-6323605 discloses a resin composition containing a cellulose ester compound (A), a poly(meth)acrylate compound (B), a polyester resin (C) and a polymer (D).

JP-A-H9-40875 discloses a resin composition containing a thermoplastic resin composition (A) and a polymer (B) having a glass transition temperature of 30° C. or lower, in which the thermoplastic resin composition (A) is in a continuous phase and the polymer (B) is in a dispersed phase.

SUMMARY

Aspects of certain non-limiting embodiments of the present disclosure relate to a resin composition, from which a resin molded article in which dispersed phases are dispersed in a continuous phase and chemical cracks are less likely to occur may be obtained, as compared with a resin composition which contains a resin (A), a resin (B), and resin particles (C), and has a continuous phase containing the resin (A) and dispersed phases containing the resin (B) and in which an area circle equivalent diameter $d_{80}$, which is an area circle equivalent diameter corresponding to 80% from a small diameter side in a number cumulative distribution of area circle equivalent diameters of the dispersed phases, is larger than 600 nm or a proportion of the dispersed phases covering the resin particles (C) with respect to the dispersed phases having an area circle equivalent diameter of 100 nm or more is less than 70% by number when a cross section along an extrusion direction in producing the resin composition is observed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a resin composition containing a resin (A), a resin (B), and resin particles (C), and having a continuous phase containing the resin (A) and dispersed phases containing the resin (B), in which when a cross section of the resin composition along an extrusion direction in producing the resin composition is observed, an area circle equivalent diameter $d_{80}$, which is an area circle equivalent diameter corresponding to 80% from a small diameter side in a number cumulative distribution of area circle equivalent diameters of the dispersed phases, is 600 nm or less.

DETAILED DESCRIPTION

Hereinafter, exemplary embodiments of the present disclosure are described. These descriptions and examples are illustrative of the exemplary embodiments and do not limit the scope of the exemplary embodiments.

In the present disclosure, a numerical value indicated by using "to" indicates a range including the numerical values described before and after "to" as the minimum value and the maximum value, respectively.

In the numerical ranges described in the present disclosure in stages, the upper limit value or the lower limit value described in one numerical range may be replaced by the upper limit value or the lower limit value of the numerical range of another numerical range. In addition, in the numerical range described in the present disclosure, the upper limit value or the lower limit value of the numerical value range may be replaced by the values shown in the examples.

In the present disclosure, the term "step" is not only an independent step but also included in the terms of the present disclosure as long as the intended purpose of the step is achieved even when it may not be clearly distinguished from other steps.

In the present disclosure, each component may contain plural kinds of corresponding substances. In the present disclosure, in a case of referring to the amount of each component in a composition, it means the total amount of the plural kinds of substances present in the composition when there are plural kinds of substances corresponding to each component in the composition, unless otherwise specified.

In the present disclosure, each component may contain plural kinds of corresponding particles. In a case where there are plural kinds of particles corresponding to each component in the composition, the particle diameter of each component means a value for a mixture of the plural kinds of particles present in the composition, unless otherwise specified.

In the present disclosure, "(meth)acryl" means at least one of acryl and methacryl, and "(meth)acrylate" means at least one of acrylate and methacrylate.

<Resin Composition>

The resin composition according to a first exemplary embodiment contains a resin (A), a resin (B) and resin particles (C), and has a continuous phase containing the resin (A) and dispersed phases containing the resin (B), and when a cross section along an extrusion direction in producing the resin composition is observed, an area circle equivalent diameter $d_{80}$, which is an area circle equivalent diameter corresponding to 80% from a small diameter side in a number cumulative distribution of area circle equivalent diameters of the dispersed phases, is 600 nm or less.

The resin composition according to a second exemplary embodiment contains a resin (A), a resin (B) and resin particles (C), and has a continuous phase containing the resin (A) and dispersed phases containing the resin (B), and when a cross section along an extrusion direction in producing the resin composition is observed, a proportion of the dispersed phases covering the resin particles (C) with respect to the dispersed phases having an area circle equivalent diameter of 100 nm or more is 70% by number or more.

Hereinafter, matters common to the resin composition according to the first exemplary embodiment and the resin composition according to the second exemplary embodiment are generically described as the resin composition according to the exemplary embodiment.

The resin composition according to the exemplary embodiment is a solid at normal temperature and normal pressure, and has an island structure in which the dispersed phases containing the resin (B) are dispersed in the continuous phase containing the resin (A).

According to the resin composition of the exemplary embodiment, a resin molded article in which the dispersed phases are dispersed in the continuous phase and chemical cracks are less likely to occur may be obtained. Although the mechanism is not clear, it is estimated as follows.

In order to improve certain characteristics of the resin molded article, a resin (B) different from the resin (A) mainly contained in the resin molded article may be added to the resin molded article in some cases. For example, in order to improve rigidity of the resin molded article, a resin (B) having an elastic modulus higher than that of the resin (A) may be added in some cases. In addition, in order to improve flexibility or toughness of the resin molded article, a resin (B) having an elastic modulus lower than that of the resin (A) may be added in some cases.

The resin (A) and the resin (B), which have different degrees in certain characteristics described above, may have low compatibility with each other. In this case, in a resin molded article containing both resins, the main resin (A) forms a continuous phase and the resin (B) forms dispersed phases dispersed in the continuous phase, generally.

As a result of examination by the present inventors, it is found that a resin molded article in a form that the dispersed phases of the resin (B) are contained in the continuous phase of the resin (A) is more likely to have chemical cracks as compared with a resin molded article in a form that the dispersed phases of the resin (B) are not contained in the continuous phase of the resin (A). It is estimated that the dispersed phases causes chemical cracks.

As a result of further examination by the present inventors, when a resin molded article in a form that the dispersed phases of the resin (B) are contained in the continuous phase of the resin (A) is added with resin particles (C) having higher affinity with the resin (B) than the resin (A), the chemical cracks are prevented. It is estimated that since the dispersed phases are formed such that the resin (B) covers the resin particles (C), the dispersed phases do not grow excessively and the dispersed phases are relatively small so that the chemical cracks are prevented.

When forms of a resin molded article containing the resin (A), the resin (B) and the resin particles (C) and a resin composition before molding are observed, the dispersed phases tend to cover the resin particles (C), and the dispersed phases are relatively small.

The resin composition according to the first exemplary embodiment is characterized in that the dispersed phases containing the resin (B) are relatively small, and when the cross section along the extrusion direction in producing the resin composition is observed, an area circle equivalent diameter $d_{80}$, which is an area circle equivalent diameter corresponding to 80% from a small diameter side in a number cumulative distribution of area circle equivalent diameters of the dispersed phases containing the resin (B), is 600 nm or less. When $d_{80}$ is larger than 600 nm, in molding a resin molded article from the resin composition, the dispersed phases tend to be excessively large, and the chemical cracks may not be prevented. From the viewpoint of preventing formation of excessively large dispersed phases in the resin molded article, $d_{80}$ in the resin composition is 600 nm or less, preferably 500 nm or less, and more preferably 400 nm or less.

The resin composition according to the second exemplary embodiment is characterized in that the dispersed phases containing the resin (B) tend to cover the resin particles (C), and when the cross section along the extrusion direction in producing the resin composition is observed, a proportion of the dispersed phases covering the resin particles (C) in the dispersed phases containing the resin (B) and having an area circle equivalent diameter of 100 nm or more is 70% by number or more. When the proportion is less than 70% by number, in molding a resin molded article from the resin composition, the dispersed phases tend to be excessively large, and the chemical cracks may not be prevented. From the viewpoint of preventing formation of excessively large dispersed phases in the resin molded article, the proportion is 70% by number or more, preferably 80% by number or more, and more preferably 90% by number or more.

A method of observing the form of the dispersed phases containing the resin (B) in the resin composition according to the exemplary embodiment is described.

The resin composition is cut along the extrusion direction in producing the resin composition (that is, cut in parallel to the extrusion direction in producing the resin composition) to obtain a thin sample. In this regard, the extrusion direction of the resin composition which is a pellet or strand cut by a general pelletizer may be specified. However, when it is difficult to specify the extraction direction, the extraction direction may be specified by repelletizing the resin composition. In a case where scanning transmission electron microscope observation is performed, the thin sample is placed in a desiccator together with a staining agent and then dyed. As the staining agent, a staining agent capable of dying the resin (A) and the resin (B) in different colors is used. The cross section of the thin sample is imaged by at least one of a scanning transmission electron microscope and a scanning probe microscope to obtain an image. A 20 μm square range is set in the central part of the image, and the area circle equivalent diameter is obtained for all dispersed phases containing the resin (B) in the 20 μm square range. In a case where the dispersed phases containing the resin (B) contain particles or a second dispersed phase, the area circle equivalent diameter of the dispersed phases containing the resin (B) is obtained based on the area including the contained particles and the second dispersed phase. Then, the area circle equivalent diameter $d_{80}$ which is an area circle equivalent diameter corresponding to 80% from a small diameter side in the number cumulative distribution of area circle equivalent diameters is obtained, and the proportion of the number of dispersed phases covering the resin particles (C) with respect to the dispersed phases having an area circle equivalent diameter of 100 nm or more is obtained. The reason for selecting dispersed phases having an area circle equivalent diameter of 100 nm or more in obtaining the proportion is as follows. It is estimated that the dispersed phases having an area circle equivalent diameter of less than 100 nm have cross sections of relatively small dispersed phases which are less likely to cause chemical cracks or a cross section of an end portion of the dispersed phases (that is, a cross section not well reflecting the covering state of the resin particles (C)). The dispersed phases covering the resin particles (C) mean dispersed phases in contact with one third or more of the outer periphery of the resin particle (C) with respect to at least one resin particle (C).

From the viewpoint of further preventing the chemical cracks in the resin molded article, it is preferable that the resin composition according to the first exemplary embodiment is also the resin composition according to the second exemplary embodiment. That is, it is preferable that the resin composition according to the exemplary embodiment contains a resin (A), a resin (B), and resin particles (C), and has a continuous phase containing the resin (A) and dispersed phases containing the resin (B), and when a cross section along an extrusion direction in producing the resin composition is observed, the area circle equivalent diameter $d_{80}$ which is an area circle equivalent diameter corresponding to 80% from the small diameter side in the number cumulative distribution of area circle equivalent diameters of the dispersed phases. is 600 nm or less and the proportion of the dispersed phases covering the resin particles (C) with respect to the dispersed phases having an area circle equivalent diameter of 100 nm or more is 70% by number or more.

It is preferable that in the resin composition according to the exemplary embodiment, the average value of the area circle equivalent diameter of the dispersed phases covering the resin particles (C) in the dispersed phases containing the resin (B) and having an area circle equivalent diameter of 100 nm or more is 400 nm or less when the cross section along the extrusion direction in producing the resin composition is observed. The smaller, the better.

It is preferable that in the resin composition according to the exemplary embodiment, the average value of the area circle equivalent diameter of the dispersed phases not covering the resin particles (C) in the dispersed phases containing the resin (B) and having an area circle equivalent diameter of 100 nm or more is 250 nm or less in a case where the proportion of the dispersed phases covering the resin particles (C) in the dispersed phases containing the resin (B) and having an area circle equivalent diameter of 100 nm or more is less than 100% by number, when the cross section along the extrusion direction in producing the resin composition is observed. The smaller, the better.

The form of the dispersed phases in the resin molded article according to the exemplary embodiment may be controlled based on the content ratio (B)/(C) of the resin (B) to the resin particles (C), the average particle diameter of the resin particles (C), the degree of affinity between the resin (B) and the resin particles (C) and the kneading temperature in producing the resin composition or the like.

It is preferable that the resin composition according to the first exemplary embodiment contains a resin (A), a resin (B) incompatible with the resin (A), and resin particles (C) having higher affinity for the resin (B) than the resin (A), in which the content of the resin (A) is larger than the content of the resin (B) and the content ratio (B)/(C) of the resin (B) to the resin particles (C) is from 0.5 to 4. According to this composition, it is easy to obtain a form in which $d_{80}$ is 600 nm or less when the cross section along the extrusion direction in producing the resin composition is observed.

It is preferable that the resin composition according to the second exemplary embodiment contains a resin (A), a resin (B) incompatible with the resin (A), and resin particles (C) having higher affinity for the resin (B) than the resin (A), in which the content of the resin (A) is larger than the content of the resin (B) and the content ratio (B)/(C) of the resin (B) to the resin particles (C) is from 0.5 to 4. According to this composition, it is easy to obtain a form in which a proportion of the dispersed phases covering the resin particles (C) in the dispersed phases containing the resin (B) and having an area circle equivalent diameter of 100 nm or more is 70% by number or more when the cross section along the extrusion direction in producing the resin composition is observed.

Hereinafter, the components of the resin composition according to the exemplary embodiment are described in detail.

[Resin (A)]

The type of the resin (A) is not limited. Examples of the resin (A) include a known resin which is a material of the resin molded article. The resin (A) is preferably a thermoplastic resin. Specific examples of the resin (A) include at least one selected from the group consisting of a mixture of a cellulose acylate and a plasticizer (D), a polyolefin and a polyamide.

—Cellulose Acylate—

The cellulose acylate is a cellulose derivative in which at least a part of hydroxy groups in a cellulose are substituted (acylated) with an acyl group. The acyl group is a group having a structure of —CO—$R^{AC}$ ($R^{AC}$ represents a hydrogen atom or a hydrocarbon group).

The cellulose acylate is, for example, a cellulose derivative represented by the following General Formula (CA).

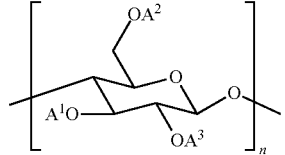

General Formula (CA)

In the General Formula (CA), $A^1$, $A^2$ and $A^3$ each independently represents a hydrogen atom or an acyl group, and n represents an integer of 2 or more. However, at least a part of n $A^1$, n $A^2$ and n $A^3$ represents an acyl group. All of n $A^1$ in the molecule may be the same, partly the same or different from each other. Similarly, all of n $A^2$ in the molecule may be the same, partly the same or different from each other and all of n $A^3$ in the molecule may be the same, partly the same or different from each other.

The hydrocarbon group in the acyl group represented by $A^1$, $A^2$ and $A^3$ may be linear, branched or cyclic, and is preferably linear or branched, and more preferably linear.

The hydrocarbon group in the acyl group represented by $A^1$, $A^2$ and $A^3$ may be a saturated hydrocarbon group or an unsaturated hydrocarbon group, and more preferably a saturated hydrocarbon group.

The acyl group represented by $A^1$, $A^2$ and $A^3$ is preferably an acyl group having 1 to 6 carbon atoms. That is, the cellulose acylate preferably has an acyl group with 1 to 6 carbon atoms. A resin molded article excellent in impact resistance may be more easily obtained from the cellulose acylate having an acyl group with 1 to 6 carbon atoms, than a cellulose acylate having an acyl group with 7 or more carbon atoms.

The acyl group represented by $A^1$, $A^2$ and $A^3$ may be a group in which a hydrogen atom in the acyl group is substituted with a halogen atom (e.g., a fluorine atom, a bromine atom and an iodine atom), an oxygen atom, a nitrogen atom or the like, and is preferably an unsubstituted group.

Examples of the acyl group represented by $A^1$, $A^2$ and $A^3$ include a formyl group, an acetyl group, a propionyl group, a butyryl group (a butanoyl group), a propenoyl group, and a hexanoyl group. Among them, the acyl group is more preferably an acyl group having 2 to 4 carbon atoms, and still more preferably an acyl group having 2 or 3 carbons, from the viewpoints of obtaining moldability of the resin composition or chemical crack resistance of the resin molded article.

Examples of the cellulose acylate include cellulose acetate (cellulose monoacetate, cellulose diacetate (DAC), and cellulose triacetate), cellulose acetate propionate (CAP), and cellulose acetate butyrate (CAB).

The cellulose acylate is preferably cellulose acetate propionate (CAP) and cellulose acetate butyrate (CAB), and more preferably cellulose acetate propionate (CAP), from the viewpoint of obtaining chemical crack resistance of the resin molded article.

The cellulose acylate may be used alone, or may be used in combination of two or more thereof.

The cellulose acylate preferably has a weight average degree of polymerization of from 200 to 1000, more preferably from 500 to 1000, and still more preferably from 600 to 1000 from the viewpoints of obtaining moldability of the resin composition or chemical crack resistance of the resin molded article.

The weight average degree of polymerization of the cellulose acylate is determined from the weight average molecular weight (Mw) by the following procedures.

First, the weight average molecular weight (Mw) of the cellulose acylate is measured in terms of polystyrene by using tetrahydrofuran with a gel permeation chromatography apparatus (GPC apparatus: HLC-8320 GPC manufactured by Tosoh Corporation, column: TSK gel α-M).

Next, the weight average molecular weight (Mw) of cellulose acylate is divided by a molecular weight of a constituent unit of cellulose acylate to determine the polymerization degree of cellulose acylate. For example, in a case where the substituent of the cellulose acylate is an acetyl group, the molecular weight of the structural unit is 263 when the degree of substitution is 2.4 and 284 when the degree of substitution is 2.9.

The degree of substitution of cellulose acylate is preferably 2.1 to 2.9, is more preferably 2.2 to 2.9, is still more preferably 2.3 to 2.9, and is particularly preferably 2.6 to 2.9, from the viewpoints of obtaining moldability of the resin composition or chemical crack resistance of the resin molded article.

In the cellulose acetate propionate (CAP), a ratio of the degree of substitution of the acetyl group to the propionyl group (acetyl group/propionyl group) is preferably 0.01 to 1, and more preferably 0.05 to 0.1, from the viewpoints of obtaining moldability of the resin composition or chemical crack resistance of the resin molded article.

The CAP preferably satisfies at least one of the following (1), (2), (3) and (4), more preferably satisfies the following (1), (3) and (4), and still more preferably satisfies the following (2), (3) and (4). (1) When measured by the GPC method using tetrahydrofuran as a solvent, the weight average molecular weight (Mw) in terms of polystyrene is from 160,000 to 250,000, and a ratio Mn/Mz of a number average molecular weight (Mn) in terms of polystyrene to a Z average molecular weight (Mz) in terms of polystyrene is from 0.14 to 0.21. (2) When measured by the GPC method using tetrahydrofuran as a solvent, the weight average molecular weight (Mw) in terms of polystyrene is from 160,000 to 250,000, a ratio Mn/Mz of a number average molecular weight (Mn) in terms of polystyrene to a Z average molecular weight (Mz) in terms of polystyrene is from 0.14 to 0.21, and a ratio Mw/Mz of a weight average molecular weight (Mw) in terms of polystyrene to the Z average molecular weight (Mz) in terms of polystyrene is from 0.3 to 0.7. (3) When measured with a capillograph at a condition of 230° C. according to ISO 11443:1995, a ratio $\eta 1/\eta 2$ of a viscosity $\eta 1$ (Pa·s) at a shear rate of 1216 (/sec) to a viscosity $\eta 2$ (Pa·s) at a shear rate of 121.6 (/sec) is from 0.1 to 0.3. (4) When a small square plate test piece (D11 test piece specified by HS K7139:2009, 60 mm×60 mm, thickness 1 mm) obtained by injection molding of the CAP is allowed to stand in an atmosphere at a temperature of 65° C. and a relative humidity of 85% for 48 hours, both an expansion coefficient in an MD direction and an expansion coefficient in a TD direction are from 0.4% to 0.6%. Here, the MD direction means the length direction of the cavity of the mold used for injection molding, and the TD direction means the direction orthogonal to the MD direction.

In the cellulose acetate butyrate (CAB), a ratio of degree of substitution of the acetyl group to the butyryl group (acetyl group/butyryl group) is preferably from 0.05 to 3.5, and more preferably from 0.5 to 3.0 from the viewpoints of obtaining moldability of the resin composition or chemical crack resistance of the resin molded article.

The degree of substitution of cellulose acylate is an index indicating the degree to which the hydroxy group of cellulose is substituted with an acyl group. That is, the degree of substitution is an index indicating the degree of acylation of cellulose acylate. Specifically, the degree of substitution means an intramolecular average of the number of substitution in which three hydroxy groups in a D-glucopyranose unit of cellulose acylate are substituted with the acyl group. The degree of substitution is determined from a ratio of a peak integral of a cellulose-derived hydrogen to a peak integral of an acyl group-derived hydrogen with $^1$H-NMR (JMN-ECA, manufactured by JEOL RESONANCE Co., Ltd.).

—Plasticizer (D)—

The plasticizer (D) is compatible with cellulose acylate and serves as a plasticizer. Examples of the plasticizer (D) includes at least one selected from the group consisting of a cardanol compound, a dicarboxylic acid di ester, a citrate, a polyether compound having at least one unsaturated bond in a molecule, a polyether ester compound, a glycol benzoate ester, an ester compound represented by the General Formula (ES1) and an epoxidized fatty acid ester.

The plasticizer (D) may be used alone, or may be used in combination of two or more thereof.

The plasticizer (D) is preferably a cardanol compound or an ester compound. Hereinafter, the cardanol compound and the ester compound suitable as the plasticizer (D) are specifically described.

—Cardanol Compound—

The cardanol compound refers to a component (e.g., a compound represented by the following structural formulas (d-1) to (d-4)) contained in a compound naturally derived from cashews or a derivative derived from the above-described component.

(d-1)

(d-2)

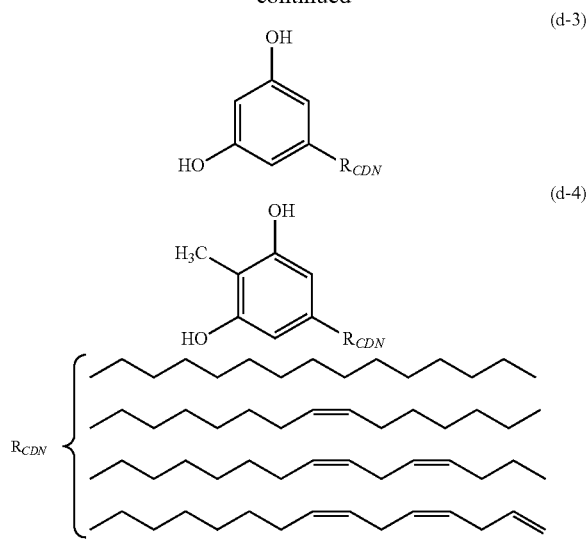

(d-3)

(d-4)

The cardanol compound may be used alone, or may be used in combination of two or more thereof.

The resin composition according to the exemplary embodiment may contain, as the cardanol compound, a mixture of compounds naturally derived from cashews (hereinafter also referred to as "cashew-derived mixture").

The resin composition according to the exemplary embodiment may contain a derivative from the cashew-derived mixture as the cardanol compound. Examples of the derivative from the cashew-derived mixture include the following mixtures or pure substances.

- A mixture prepared by adjusting the composition ratio of each component in the cashew-derived mixture
- A pure substance which is a specific component isolated from the cashew-derived mixture
- A mixture containing a modified product obtained by modifying components in the cashew-derived mixture
- A mixture containing a polymer obtained by polymerizing a component in the cashew-derived mixture
- A mixture containing a modified polymer obtained by modifying and polymerizing a component in the cashew-derived mixture
- A mixture containing a modified product obtained by further modifying the components in the mixture prepared by adjusting the composition ratio of each component in the cashew-derived mixture
- A mixture containing a polymer obtained by further polymerizing the components in the mixture prepared by adjusting the composition ratio of each component in the cashew-derived mixture
- A mixture containing a modified polymer obtained by further modifying and polymerizing the components in the mixture prepared by adjusting the composition ratio of each component in the cashew-derived mixture
- A modified product obtained by further modifying the pure substance
- A polymer obtained by further polymerizing the pure substance
- A modified polymer obtained by further modifying and polymerizing the pure substance Here, a pure substance includes a multimer such as a dimer and a trimer.

The cardanol compound is preferably a compound being at least one selected from the group consisting of a compound represented by a General Formula (CDN1) and a polymer obtained by polymerizing a compound represented by the General Formula (CDN1), from the viewpoint of obtaining the transparency of the resin molded article.

General Formula (CDN1)

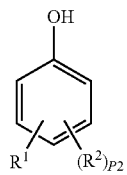

In the General Formula (CDN1), $R^1$ represents an alkyl group which may have a substituent or an unsaturated aliphatic group which has a double bond and may have a substituent. $R^2$ represents a hydroxy group, a carboxy group, an alkyl group which may have a substituent or an unsaturated aliphatic group which has a double bond and may have a substituent. P2 represents an integer of 0 to 4. Each of $R^2$ present in plural in a case where P2 is 2 or more may be the same group or different groups.

In the General Formula (CDN1), the alkyl group which may have a substituent represented by $R^1$ is preferably an alkyl group having 3 to 30 carbon atoms, is more preferably an alkyl group having 5 to 25 carbon atoms, and is still more preferably an alkyl group having 8 to 20 carbon atoms.

Examples of the substituent include: a hydroxy group; a substituent containing an ether bond, such as an epoxy group or a methoxy group; a substituent containing an ester bond, such as an acetyl group or a propionyl group; or the like.

Examples of the alkyl group which may have a substituent include pentadecan-1-yl group, heptan-1-yl group, octan-1-yl group, nonan-1-yl group, decan-1-yl group, undecan-1-yl group, dodecan-1-yl group, tetradecan-1-yl group, or the like.

In the General Formula (CDN1), the unsaturated aliphatic group which has a double bond and may have a substituent represented by $R^1$ is preferably an unsaturated aliphatic group having 3 to 30 carbon atoms, is more preferably an unsaturated aliphatic group having 5 to 25 carbon atoms, and is still more preferably an unsaturated aliphatic group having 8 to 20 carbon atoms.

The number of double bonds contained in the unsaturated aliphatic group is preferably 1 to 3.

Examples of the substituent include the same substituent as those of the alkyl group.

Examples of the unsaturated aliphatic group which has a double bond and may have a substituent include pentadeca-8-en-1-yl group, pentadeca-8,11-dien-1-yl group, pentadeca-8,11,14-trien-1-yl group, pentadeca-7-en-1-yl group, pentadeca-7,10-dien-1-yl group, pentadeca-7,10,14-trien-1-yl group, or the like.

In the General Formula (CDN1), $R^1$ is preferably pentadeca-8-en-1-yl group, pentadeca-8,11-dien-1-yl group, pentadeca-8,11,14-trien-1-yl group, pentadeca-7-en-1-yl group, pentadeca-7,10-dien-1-yl group, and pentadeca-7,10,14-trien-1-yl group.

In the General Formula (CDN1), preferable examples of the alkyl group which may have a substituent and the unsaturated aliphatic group which has a double bond and may have a substituent, which are represented by $R^2$, are the same as those of the alkyl group which may have a substituent and the unsaturated aliphatic group which has a double bond and may have a substituent, which are represented by $R^1$.

The compound represented by the General Formula (CDN1) may be further modified. For example, the compound may be epoxidized. Specifically, the compound may be a compound having a structure in which the hydroxy group of the compound represented by the General Formula (CDN1) is replaced with the following group (EP), i.e., a compound represented by the following General Formula (CDN1-e).

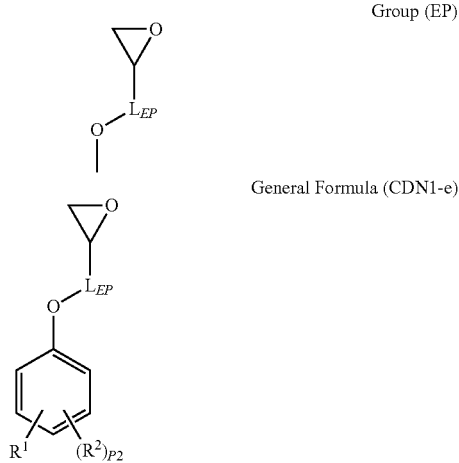

Group (EP)

General Formula (CDN1-e)

In the group (EP) and the General Formula (CDN1-e), $L_{EP}$ represents a single bond or a divalent linking group. In the General Formula (CDN1-e), each of the $R^1$, $R^2$ and P2 is the same as $R^1$, $R^2$ and P2 in the General Formula (CDN1), respectively.

In the group (EP) and the General Formula (CDN1-e), examples of the divalent linking group represented by $L_{EP}$ include an alkylene group which may have a substituent (preferably an alkylene group having 1 to 4 carbon atoms, and more preferably an alkylene group having 1 carbon atom), a $-CH_2CH_2OCH_2CH_2-$ group, or the like.

Examples of the substituent include the same substituent as those in $R^1$ of the General Formula (CDN1).

$L_{EP}$ is preferably a methylene group.

The polymer obtained by polymerizing a compound represented by the General Formula (CDN1) refers to a polymer obtained by polymerizing at least two compounds represented by the General Formula (CDN1) with or without a linking group.

Examples of the polymer obtained by polymerizing the compound represented by the General Formula (CDN1) include a compound represented by the following General Formula (CDN2).

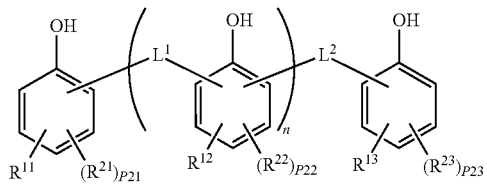

General Formula (CDN2)

In the General Formula (CDN2), $R^{11}$, $R^{12}$ and $R^{13}$ each independently represent an alkyl group which may have a substituent, or an unsaturated aliphatic group which has a double bond and may have a substituent. $R^{21}$, $R^{22}$ and $R^{23}$ each independently represent a hydroxy group, a carboxy group, an alkyl group which may have a substituent, or an unsaturated aliphatic group which has a double bond and may have a substituent. P21 and P23 each independently represent an integer of 0 to 3, and P22 represents an integer of 0 to 2. $L^1$ and $L^2$ each independently represent a divalent linking group. n represents an integer of 0 to 10. $R^{21}$ present in plural in a case where P21 is 2 or more may be the same group or different groups, $R^{22}$ present in plural in a case where P22 is 2 or more may be the same group or different groups, and $R^{23}$ present in plural in a case where P23 is 2 or more may be the same group or different groups. $R^{12}$ present in plural in a case where n is 2 or more may be the same group or different groups, $R^{22}$ present in plural in a case where n is 2 or more may be the same group or different groups, and $L^1$ present in plural in a case where n is 2 or more may be the same group or different groups, and P22 present in plural in a case where n is 2 or more may be the same number or different number.

In the General Formula (CDN2), preferred examples of the alkyl group which may have a substituent, and the unsaturated aliphatic group which has a double bond and may have a substituent, which are represented by $R^{11}$, $R^{12}$, $R^{13}$, $R^{21}$, $R^{22}$ and $R^{23}$ include the same groups exemplified as $R^1$ of the General Formula (CDN1).

In the General Formula (CDN2), examples of the divalent linking group represented by $L^1$ and $L^2$ include an alkylene group which may have a substituent (preferably an alkylene group having 2 to 30 carbon atoms, and more preferably an alkylene group having 5 to 20 carbon atoms), or the like.

Examples of the substituent include the same substituents as those in $R^1$ of the General Formula (CDN1).

In the General Formula (CDN2), n is preferably 1 to 10, and more preferably 1 to 5.

The compound represented by the General Formula (CDN2) may be further modified. For example, the compound may be epoxidized. Specifically, the compound may be a compound having a structure in which the hydroxy group of the compound represented by the General Formula (CDN2) is replaced with the group (EP), i.e., a compound represented by the following General Formula CDN2-e).

General Formula (CDN2-e)

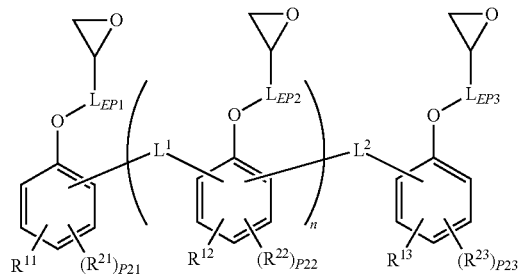

In the General Formula (CDN2-e), $R^{11}$, $R^{12}$, $R^{13}$, $R^{21}$, $R^{22}$, $R^{23}$, P21, P22, P23, $L^1$, $L^2$ and n is the same as $R^{11}$, $R^{12}$, $R^{13}$, $R^{21}$, $R^{22}$, $R^{23}$, P21, P22, P23, $L^1$, $L^2$ and n in the general formula (CDN2).

In the General Formula (CDN2-e), $L_{EP1}$, $L_{EP2}$ and $L_{EP3}$ each independently represent a single bond or a divalent linking group. Each of $L_{EP2}$ present in plural in a case where n is 2 or more may be the same group or different groups.

In the General Formula (CDN2-e), preferred examples of the divalent linking group represented by $L_{EP1}$, $L_{EP2}$ and $L_{EP3}$ include the same groups exemplified as the divalent linking group represented by $L_{EP}$ in the General Formula (CDN1-e).

The polymer obtained by polymerizing a compound represented by the General Formula (CDN1) may be, for example, a polymer obtained by three-dimensionally cross-linking and polymerizing at least three compounds represented by the General Formula (CDN1) with or without a linking group. Examples of the polymer obtained by three-dimensionally crosslinking and polymerizing the compound represented by the General Formula (CDN1) include a compound represented by the following structural formula.

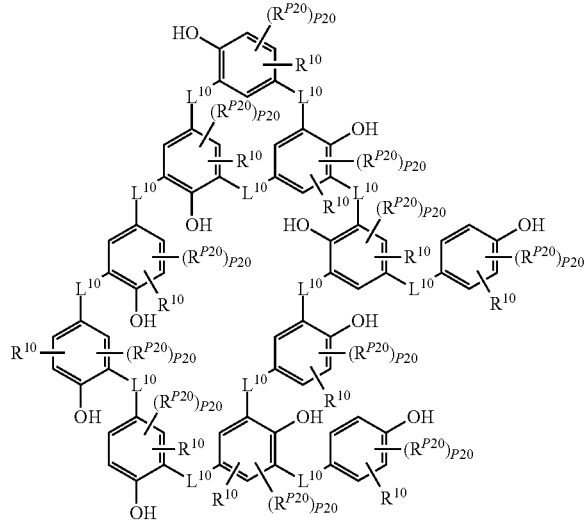

In the above structural formula, $R^{10}$, $R^{20}$ and P20 is the same as $R^1$, $R^2$ and P2 in the General Formula (CDN1), respectively. $L^{10}$ represents a single bond or a divalent linking group. $R^{10}$ present in plural may be the same group or different groups, $R^{20}$ present in plural may be the same group or different groups, and $L^{10}$ may be the same group or different groups. P20 present in plural may be the same number or different numbers.

In the above structural formula, examples of the divalent linking group represented by $L^{10}$ include an alkylene group which may have a substituent (preferably an alkylene group having 2 to 30 carbon atoms, and more preferably an alkylene group having 5 to 20 carbon atoms).

Examples of the substituent include the same substituents as those in $R^1$ of the General Formula (CDN1).

The compound represented by the above structural formula may be further modified. For example, the compound may be epoxidized. Specifically, the compound may be a compound having a structure in which the hydroxy group of the compound represented by the above structural formula is substituted with the group (EP), for example, a polymer represented by the following structural formula, i.e., a polymer obtained by three-dimensionally crosslinking and polymerizing the compound represented by the General Formula (CDN1-e).

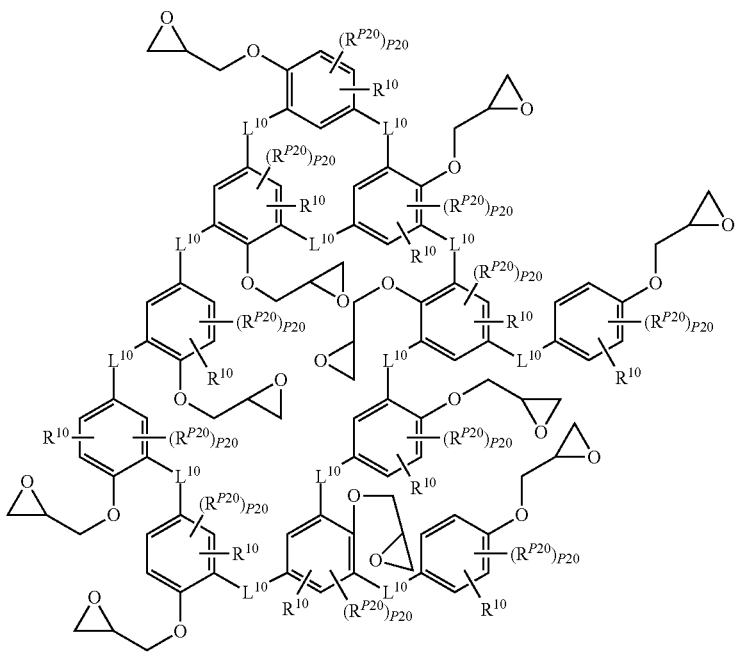

In the above structural formula, $R^{10}$, $R^{20}$ and P20 is the same as $R^1$, $R^2$ and P2 in the General Formula (CDN1-e), respectively. $L^{10}$ represents a single bond or a divalent linking group. $R^{10}$ present in plural may be the same group or different groups, $R^{20}$ present in plural may be the same group or different groups and $L^{10}$ present in plural may be the same group or different groups. P20 present in plural may be the same number or different numbers.

In the above structural formula, examples of the divalent linking group represented by $L^{10}$ include an alkylene group which may have a substituent (preferably an alkylene group having 2 to 30 carbon atoms, and more preferably an alkylene group having 5 to 20 carbon atoms).

Examples of the substituent include the same substituents as those in $R^1$ of the General Formula (CDN1).

The cardanol compound preferably contains a cardanol compound having an epoxy group, and is more preferably a cardanol compound having an epoxy group, from the viewpoint of improving the transparency of the resin molded article.

A commercially available product may be used as the cardanol compound. Examples of the commercially available product include: NX-2024, Ultra LITE 2023, NX-2026, GX-2503, NC-510, LITE 2020, NX-9001, NX-9004, NX-9007, NX-9008, NX-9201, and NX-9203, manufactured by Cardolite Corporation; and LB-7000, LB-7250, and CD-5L manufactured by Tohoku Chemical Industry Co., Ltd. Examples of the commercially available product of the cardanol compound having an epoxy group include NC-513, NC-514S, NC-547, LITE 513E, and Ultra LTE 513 manufactured by Cardolite Corporation.

The cardanol compound preferably has a hydroxyl value of 100 mgKOH/g or more, more preferably 120 mgKOH/g or more, and still more preferably 150 mgKOH/g or more, from the viewpoint of obtaining the transparency of the resin molded article. The hydroxyl value of the cardanol compound is measured according to Method A of ISO14900.

When a cardanol compound having an epoxy group is used as the cardanol compound, an epoxy equivalent is preferably 300 to 500, more preferably 350 to 480, and still more preferably 400 to 470, from the viewpoint of improving the transparency of the resin molded article. The epoxy equivalent of the cardanol compound having an epoxy group is measured according to ISO3001.

The cardanol compound preferably has a molecular weight of 250 to 1000, more preferably 280 to 900, and still more preferably 300 to 800, from the viewpoint of obtaining compatibility with cellulose acylate.

—Ester Compound—

Examples of the ester compound as the plasticizer (D) include a dicarboxylic diester, a citrate, a polyether ester compound, a glycol benzoate, an ester compound represented by the following General Formula (ES1), and an epoxidized fatty acid ester. Examples of these ester include monoesters, diesters, triesters, and polyesters.

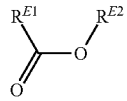

General Formula (ES1)

In the General Formula (ES1), $R^{E1}$ represents an aliphatic hydrocarbon group having 7 to 28 carbon atoms, and $R^{E2}$ represents an aliphatic hydrocarbon group having 1 to 8 carbon atoms.

In the General Formula (ES1), the group represented by $R^{E1}$ may be a saturated aliphatic hydrocarbon group, or an unsaturated aliphatic hydrocarbon group, and is preferably a saturated aliphatic hydrocarbon group. The group represented by $R^{E1}$ may be a linear aliphatic hydrocarbon group, a branched aliphatic hydrocarbon group, or an aliphatic hydrocarbon group containing an alicyclic ring, and is preferably an aliphatic hydrocarbon group not containing an alicyclic ring (that is, a chain aliphatic hydrocarbon group), and more preferably a linear aliphatic hydrocarbon group. The group represented by $R^{E1}$ is particularly preferably a linear saturated aliphatic hydrocarbon group. The group represented by $R^{E1}$ may be a group in which a hydrogen atom in the aliphatic hydrocarbon group is substituted with a halogen atom (e.g., a fluorine atom, a bromine atom and an iodine atom), an oxygen atom, a nitrogen atom or the like, and is an preferably unsubstituted group. The group represented by $R^{E1}$ preferably has 9 or more carbon atoms, more preferably 10 or more carbon atoms, and still more preferably 15 or more carbon atoms. The group represented by $R^{E1}$ preferably has 24 or less carbon atoms, more preferably 20 or less carbon atoms, and still more preferably 18 or less carbon atoms. The group represented by $R^{E1}$ is particularly preferably an aliphatic hydrocarbon group having 17 carbon atoms.

In the General Formula (ES1), the group represented by $R^{E2}$ may be a saturated aliphatic hydrocarbon group, or an unsaturated aliphatic hydrocarbon group, and is preferably a saturated aliphatic hydrocarbon group. The group represented by $R^{E2}$ may be a linear aliphatic hydrocarbon group, a branched aliphatic hydrocarbon group, or an aliphatic hydrocarbon group containing an alicyclic ring, and is preferably a branched aliphatic hydrocarbon group. The group represented by $R^{E2}$ may be a group in which a hydrogen atom in the aliphatic hydrocarbon group is substituted with a halogen atom (e.g., a fluorine atom, a bromine atom and an iodine atom), an oxygen atom, a nitrogen atom or the like, and is preferably an unsubstituted group. The group represented by $R^{E2}$ preferably has 2 or more carbon atoms, more preferably 3 or more carbon atoms, and still more preferably 4 or more carbon atoms.

Specific examples of the ester compound as the plasticizer (D) include adipates, citrates, sebacates, azelates, phthalates, acetates, dibasiates, phosphates, condensed phosphates, glycol esters (e.g., glycol benzoate), and modified products of fatty acid esters (e.g., epoxidized fatty acid esters). Examples of the above ester include a monoester, a diester, a tri ester, and a polyester. Among them, dicarboxylic diesters (e.g., adipic acid diester, sebacic acid diester, azelaic acid diester, and phthalic acid diester) are preferable.

The polyether ester compound as the plasticizer (D) preferably has a molecular weight (or weight average molecular weight) of 200 to 2000, more preferably 250 to 1500, and still more preferably 280 to 1000. The weight average molecular weight of the ester compound is a value measured according to the method of measuring the weight average molecular weight of cellulose acylate, unless otherwise specified.

The plasticizer (D) is preferably an adipate ester. The adipate ester has high affinity with cellulose acylate, and disperses in a state close to uniformity to cellulose acylate, thereby further improving thermal fluidity as compared with another plasticizer (D).

Specific examples of the adipate ester include an adipate diester represented by the following General Formula (AE) and an adipate polyester represented by the following General Formula (APE).

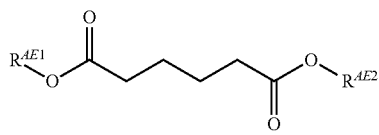

General Formula (AE)

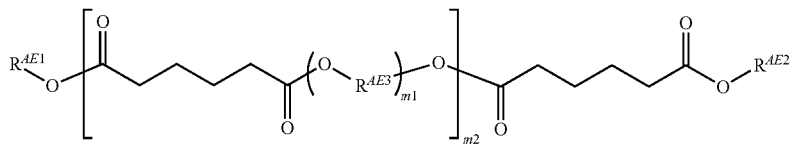

General Formula (APE)

In the General Formula (AE), $R^{AE1}$ and $R^{AE2}$ each independently represent an alkyl group or a polyoxyalkyl group [—$(C_xH_{2x}$—$O)_y$—$R^{A1}$] (Here, $R^{A1}$ represents an alkyl group, x represents an integer of 1 to 10, and y represents an integer of 1 to 10.).

In the General Formula (APE), $R^{AE1}$ and $R^{AE2}$ each independently represent an alkyl group or a polyoxyalkyl group [—$(C_xH_{2x}$—$O)_y$—$R^{A1}$] (Here, $R^{A1}$ represents an alkyl group, x represents an integer of 1 to 10, and y represents an integer of 1 to 10.), and $R^{AE3}$ represents an alkylene group. m1 represents an integer of 1 to 10, and m2 represents an integer of 1 to 20.

In the General Formula (AE) and the General Formula (APE), the alkyl group represented by $R^{AE1}$ and $R^{AE2}$ is preferably an alkyl group having 1 to 12 carbon atoms, more preferably an alkyl group having 4 to 10 carbon atoms, and still more preferably an alkyl group having 8 carbon atoms. The alkyl group represented by $R^{AE1}$ and $R^{AE2}$ may be linear, branched or cyclic, and is preferably linear or branched.

In the polyoxyalkyl group [—$(C_xH_{2x}$—$O)_y$—$R^{A1}$] represented by $R^{AE1}$ and $R^{AE2}$ in the General Formula (AE) and the General Formula (APE), the alkyl group represented by $R^{A1}$ is preferably an alkyl group having 1 to 6 carbon atoms, and more preferably an alkyl group having 1 to 4 carbon atoms. The alkyl group represented by $R^{A1}$ may be linear, branched or cyclic, and is preferably linear or branched.

In the general formula (APE), the alkylene group represented by $R^{AE3}$ is preferably an alkylene group having 1 to 6 carbon atoms, and more preferably an alkylene group having 1 to 4 carbon atoms. The alkylene group may be linear, branched or cyclic, and is preferably linear or branched.

In the General Formula (APE), m1 is preferably an integer of 1 to 5, and m2 is preferably an integer of 1 to 10.

In the General Formula (AE) and the General Formula (APE), the group represented by each code may be substituted with a substituent. Examples of the substituent include an alkyl group, an aryl group, a hydroxy group.

The adipate ester preferably has a molecular weight (or weight average molecular weight) of 250 to 2000, more preferably 280 to 1500, and still more preferably 300 to 1000. The weight average molecular weight of the adipate ester is a value measured according to the method of measuring the weight average molecular weight of cellulose acylate.

A mixture of an adipate ester and other components may be used as the adipate ester. Examples of the commercially available product of the mixture include Daifatty 101 manufactured by DAIHACHI CHEMICAL INDUSTRY CO., LTD.

The hydrocarbon group at the end of a fatty acid ester such as citrate, sebacic acid ester, azelaic acid ester, phthalic acid ester, and acetic acid ester is preferably an aliphatic hydrocarbon group, preferably an alkyl group having 1 to 12 carbon atoms, more preferably an alkyl group having 4 to 10 carbons, and still more preferably an alkyl group having 8 carbons. The alkyl group may be linear, branched or cyclic, and is preferably linear or branched.

Examples of the fatty acid esters such as citrate, sebacic acid ester; azelaic acid ester, phthalic acid ester, and acetic acid ester include ester of fatty acid and alcohol. Examples of the alcohol include: monohydric alcohols such as methanol, ethanol, propanol, butanol, and 2-ethylhexanol; polyhydric alcohols such as glycerin, polyglycerol (diglycerin or the like), pentaerythritol, ethylene glycol, diethylene glycol, propylene glycol, butylene glycol, trimethylolpropane, trimethylol ethane, and a sugar alcohol.

Examples of glycol in glycol benzoate include ethylene glycol, diethylene glycol, and propylene glycol.

The epoxidized fatty acid ester is an ester compound having a structure (i.e., oxacyclopropane) in which carbon-carbon unsaturated bonds of unsaturated fatty acid esters are epoxidized. Examples of the epoxidized fatty acid ester include ester of fatty acid and alcohol in which some or all of the carbon-carbon unsaturated bonds are epoxidized in the unsaturated fatty acid (e.g., oleic acid, palmitoleic acid, vaccenic acid, linoleic acid, linolenic acid, and nervonic acid). Examples of alcohol include: monohydric alcohols such as methanol, ethanol, propanol, butanol, and 2-ethyl hexanol; polyhydric alcohols such as glycerin, polyglycerol (diglycerin or the like), pentaerythritol, ethylene glycol, diethylene glycol, propylene glycol, butylene glycol, trimethylolpropane, trimethylol ethane, and sugar alcohol.

Examples of the commercially available product of the epoxidized fatty acid ester include ADK Cizer D-32, D-55, O-130P, and O-180A (manufactured by ADEKA), and Sanso Cizer E-PS, nE-PS, E-PO, E-4030, E-6000, E-2000H, and E-9000H (manufactured by New Japan Chemical Co., Ltd.).

A polyester unit of the polyetherester compound may be either aromatic or aliphatic (including alicyclic) and a polyether unit of the polyetherester compound may be either aromatic or aliphatic (including alicyclic). A content ratio of the polyester unit to the polyether unit is, for example, from 20:80 to 80:20. The polyether ester compound preferably has a molecular weight (or weight average molecular weight) of 250 to 2000, more preferably 280 to 1500, and still more preferably 300 to 1000. Examples of the commercially available product of the polyether ester compound include ADK Cizer RS-1000 (prepared by ADEKA CORPORATION).

As a polyether compound having at least one unsaturated bond in a molecule, a polyether compound having an allyl group at the terminal thereof is exemplified, and a polyalkylene glycol allyl ether is preferable. The polyether compound having at least one unsaturated bond in a molecule has a molecular weight (or weight average molecular weight) of 250 to 2000, more preferably 280 to 1500, and still more preferably 300 to 1000. Examples of the commercially available product of the polyether compound having at least one unsaturated bond in a molecule include polyalkylene glycol allyl ether such as UNIOX PKA-5006, UNIOX PKA-5008, UNIOL PKA-5014, and UNIOL PKA-5017 (prepared by NOF CORPORATION).

—Polyolefin—

The type of a polyolefin as the resin (A) is not limited. Examples of the polyolefin include any known polyolefin. The polyolefin may be a copolymer or a homopolymer. The polyolefin may be linear or branched.

The polyolefin may contain a structural unit derived from a monomer other than an olefin. The structural unit derived from a monomer other than an olefin is preferably 30% by mass or less based on the whole polyolefin.

Examples of the olefin constituting the polyolefin include a linear or branched aliphatic olefin and an alicyclic olefin. Examples of the aliphatic olefin include an α-olefin such as ethylene, propylene, 1-butene, 1-hexene, 4-methyl-1-pentene, 1-octene, 1-decene, 1-hexadecene, and 1-octadecene. Examples of the alicyclic olefin include cyclopentene, cycloheptene, norbornene, 5-methyl-2-norbornene, tetracyclododecene, and vinylcyclohexane.

Examples of the monomer other than the olefin constituting the polyolefin include known addition polymerizable compounds. Examples of the addition polymerizable compound include: styrenes such as styrene, methylstyrene, α-methylstyrene, β-methylstyrene, t-butylstyrene, chlorostyrene, chloromethylstyrene, methoxystyrene, styrenesulfonic acid or a salt thereof; (meth)acrylates such as alkyl (meth)acrylate, benzyl (meth)acrylate and dimethylaminoethyl (meth)acrylate; halovinyls such as vinyl chloride; vinyl esters such as vinyl acetate and vinyl propionate; vinyl ethers such as vinyl methyl ether; vinylidene halides such as vinylidene chloride; and N-vinyl compounds such as N-vinyl pyrrolidone.

Specific examples of the polyolefin include polyethylene, polypropylene, polybutene, polyisobutylene, a coumarone-indene resin, a terpene resin, and an ethylene vinyl acetate copolymer resin.

A molecular weight of the polyolefin is not limited, and, for example, the weight average molecular weight (Mw) is 10,000 to 300,000.

—Polyamide—

The type of the polyamide as the resin (A) is not limited. Examples of the polyamide include any known polyamide. The polyamide may be either a polyamide containing an aliphatic skeleton or a polyamide (aramid) containing only a wholly aromatic skeleton. The aramid may be a meta-type or a para-type.

Examples of the polyamide include a polyamide obtained through co-polycondensation of a dicarboxylic acid and a diamine, and a polyamide obtained through ring-opening polycondensation of a lactam. Examples of the dicarboxylic acid include oxalic acid, adipic acid, suberic acid, sebacic acid, terephthalic acid, isophthalic acid, 1,4-cyclohexanedicarboxylic acid, malonic acid, succinic acid, glutaric acid, pimelic acid, azelaic acid, and phthalic acid. Examples of the diamine include ethylenediamine, pentamethylenediamine, hexamethylenediamine, nonanediamine, decamethylenediamine, 1,4-cyclohexanediamine, p-phenylenediamine, m-phenylenediamine, and m-xylenediamine. Examples of the lactam include ε-caprolactam, undecane lactam, and lauryl lactam.

Specific examples of the polyamide include nylon 6, nylon 11, nylon 12, nylon MXD6, nylon 6T, polyaminotriazole, polybenzimidazole, polyoxadiazole, polyamideimide, and piperazine polyimide.

Other examples of the resin (A) include: a polycarbonate resin; a polyester resin; a polyester carbonate resin; a polyphenylene ether resin; a polyphenylene sulfide resin; a polysulfone resin; a polyether sulfone resin; a polyarylene resin; a polyether imide resin; a polyacetal resin; a polyvinyl acetal resin; a polyketone resin; a polyether ketone resin; a polyether ether ketone resin; a polyaryl ketone resin; a polyether nitrile resin; a liquid crystal resin; a polybenzimidazole resin; a polyparabanic acid resin; a vinyl polymer or copolymer obtained by polymerizing or copolymerizing one or more vinyl monomers selected from the group consisting of an aromatic alkenyl compound, a methacrylic acid ester, an acrylic acid ester, and a vinyl cyanide compound; a diene-aromatic alkenyl compound copolymer; a vinyl cyanide-diene-aromatic alkenyl compound copolymer; an aromatic alkenyl compound-diene-vinyl cyanide-N-phenyl maleimide copolymer; a vinyl cyanide-(ethylene-diene-propylene (EPDM))-aromatic alkenyl compound copolymer; a vinyl chloride resin; and a chlorinated vinyl chloride resin.

As the resin (A), one type of resin may be used alone, two or more types of resins may be used in combination.

[Resin (B)]

The resin (B) is preferably a resin incompatible with the resin (A). Incompatibility of the resin (B) with the resin (A) may be confirmed by a fact that when the cross section of the resin composition containing both resins is observed with a microscope, the resin (A) and the resin (B) are separated into separate solid phases.

The resin (B) is mixed with the resin (A) in order to, for example, improve or change the characteristics of the resin molded article. The type of the resin (B) is not limited. Examples of the resin (B) include a known resin which is a material of the resin molded article. The resin (B) is preferably a thermoplastic resin. Specific examples of the resin (B) include at least one selected from the group consisting of a polyester, an acrylic resin, a copolymer containing 50% by mass or more of structural units derived from an alkyl (meth)acrylate, a polystyrene, a copolymer containing 50% by mass or more of structural units derived from a styrene, and a styrene acrylonitrile copolymer.

—Polyester—

The polyester is, for example, a polymer of hydroxyalkanoate (hydroxyalkanoic acid), a polycondensate of a polyvalent carboxylic acid and a polyhydric alcohol, and a ring-opening polycondensate of cyclic lactam.

An example of the polyester is an aliphatic polyester resin. Examples of the aliphatic polyester include a polyhydroxyalkanoate, and a polycondensate of an aliphatic diol and an aliphatic carboxylic acid.

Examples of the polyhydroxyalkanoate include a homopolymer of a hydroxyalkanoic acid (such as lactic acid, 2-hydroxybutyric acid, 3-hydroxybutyric acid, 4-hydroxybutyric acid, 2-hydroxy-3-methylbutyric acid, 2-hydroxy-3,3-dimethylbutyric acid, 3-hydroxyvaleric acid, 4-hydroxyvaleric acid, 5-hydroxyvaleric acid, 3-hydroxyhexanoic acid, 2-hydroxyhexanoic acid, 2-hydroxyisohexanoic acid, 6-hydroxyhexanoic acid, 3-hydroxypropionic acid, 3-hydroxy-2,2-dimethylpropionic acid, 3-hydroxyhexanoic acid, and 2-hydroxy-n-octanoic acid), or a copolymers of two or more kinds of these hydroxyalkanoic acids.

Specific examples of the polyhydroxyalkanoate include a homopolymer of a branched hydroxyalkanoic acid having 2 to 4 carbon atoms, a homopolymer of a branched hydroxyalkanoic acid having 2 to 4 carbon atoms and a branched hydroxyalkanoic acid having 5 to 7 carbon atoms, a homopolymer of a branched hydroxyalkanoic acid having 3 carbon atoms (i.e., polylactic acid), and a homopolymer of 3-hydroxybutyric acid and 3-hydroxyhexanoic acid (i.e., polyhydroxybutyrate hexanoate). The number of carbon atoms of the hydroxyalkanoic acid is a number including the number of carbon atoms of the carboxy group.

Examples of the polylactic acid include a poly-L-lactic acid having L-lactic acid as a structural unit, a poly-D-lactic acid having D-lactic acid as a structural unit, a poly-DL-lactic acid having L-lactic acid and D-lactic acid as structural units, and a mixture thereof.

The weight average molecular weight (Mw) of the polyester is not particularly limited and is, for example, 10,000 to 1,000,000, 50,000 to 800,000, and 100,000 to 600,000.

—Acrylic Resin—

The acrylic resin in the present disclosure contains polymers and copolymers of an alkyl acrylate, polymers and copolymers of an alkyl methacrylate, and copolymers of an alkyl acrylate and an alkyl methacrylate. Examples of the alkyl (meth)acrylate include an alkyl (meth)acrylate having an alkyl chain with 1 to 8 carbon atoms, an alkyl (meth)acrylate having an alkyl chain with 1 to 4 carbon atoms, and an alkyl (meth)acrylate having an alkyl chain with 1 or 2 carbon atoms. An example of the acrylic resin includes polymethyl methacrylate (PMMA).

The weight average molecular weight (Mw) of the acrylic resin is not particularly limited and is, for example, 15,000 to 120,000, more than 20,000 and 100,000 or less, 22,000 to 100,000, or 25,000 to 100,000.

—Copolymer Containing 50% by Mass or More of Structural Units Derived From Alkyl (Meth)acrylate—

The copolymer containing 50% by mass or more of structural units derived from an alkyl (meth)acrylate (referred to as "acrylic copolymer" in the present disclosure) contains, for example, 50% by mass or more of a structural unit derived from an alkyl (meth)acrylate having an alkyl chain with 1 to 8 carbon atoms, a structural unit derived from an alkyl (meth)acrylate having an alkyl chain with 1 to 4 carbon atoms, or a structural unit derived from an alkyl (meth)acrylate having an alkyl chain with of 1 or 2 carbon atoms. The acrylic copolymer contains the structural unit derived from an alkyl (meth)acrylate preferably in an amount of 70% by mass or more, and more preferably 80% by mass or more.

The acrylic copolymer contains a structural unit derived from, for example, styrenes (for example, monomers having a styrene skeleton such as a styrene, alkyl-substituted styrenes (α-methylstyrene, 2-methylstyrene, 3-methylstyrene, 4-methylstyrene, 2-ethylstyrene, 3-ethylstyrene, 4-ethyl styrene, or the like), halogen-substituted styrenes (2-chlorostyrene, 3-chlorostyrene, 4-chlorostyrene, or the like), vinyl naphthalenes (2-vinyl naphthalene or the like), and hydroxystyrenes (4-ethenylphenol or the like)), and unsaturated dicarboxylic anhydrides (for example, monomers having an unsaturated dicarboxylic anhydride skeleton such as maleic anhydride, itaconic anhydride, glutaconic anhydride, citraconic anhydride, and aconitic anhydride) in a range of 50% by mass or less.

An example of the acrylic copolymer includes a styrene methyl methacrylate copolymer containing 50% by mass or more of structural units derived from methyl methacrylate. In the styrene methyl methacrylate copolymer, the structural unit derived from methyl methacrylate is preferably 50% by mass to 95% by mass, more preferably 60% by mass to 90% by mass, and still more preferably 70% by mass to 85% by mass.

The weight average molecular weight (Mw) of the acrylic copolymer is not particularly limited and is, for example, 15,000 to 120,000, more than 20,000 and 100,000 or less, 22,000 to 100,000, or 25,000 to 100,000.

—Polystyrene—

The weight average molecular weight (Mw) of the polystyrene is not particularly limited and is, for example, 15,000 to 120,000, more than 20,000 and 100,000 or less, 22,000 to 100,000, or 25,000 to 100,000.

—Copolymer Containing 50% by Mass or More of Structural Units Derived From Styrene—

The copolymer containing 50% by mass or more of structural units derived from a styrene (referred to as "styrene copolymer" in the present disclosure) contains a structural unit derived from a styrene preferably in an amount of 70% by mass or more, and more preferably 80% by mass or more. The structural unit derived from a styrene includes a structural unit derived from alkyl-substituted styrenes (such as α-methylstyrene, 2-methylstyrene, 3-methylstyrene, 4-methylstyrene, 2-ethylstyrene, 3-ethylstyrene, and 4-ethylstyrene) and a structural unit derived from halogen-substituted styrenes (such as 2-chlorostyrene, 3-chlorostyrene, and 4-chlorostyrene).

The styrene copolymer contains a structural unit derived from, for example, monomers having a styrene skeleton such as vinyl naphthalene (2-vinyl naphthalene or the like), and hydroxystyrenes (4-ethenyl phenol or the like), unsaturated dicarboxylic anhydrides (for example, monomers having an unsaturated dicarboxylic anhydride skeleton such as maleic anhydride, itaconic anhydride, glutaconic anhydride, citraconic anhydride, and aconitic anhydride), alkyl (meth)acrylates (for example, an alkyl (meth)acrylate having an alkyl chain with 1 to 8 carbon atoms, an alkyl (meth)acrylate having an alkyl chain with 1 to 4 carbon atoms, and an alkyl (meth)acrylate having an alkyl chain with 1 or 2 carbon atoms) in a range of 50% by mass or less.

An example of the styrene copolymer includes a styrene methyl methacrylate copolymer containing 50% by mass or more of structural units derived from styrene. In the styrene methyl methacrylate copolymer, the structural unit derived from styrene is preferably 50% by mass to 95% by mass, more preferably 60% by mass to 90% by mass, and still more preferably 70% by mass to 85% by mass.

The weight average molecular weight (Mw) of the styrene copolymer is not particularly limited and is, for example, 15,000 to 120,000, more than 20,000 and 100,000 or less, 22,000 to 100,000, or 25,000 to 100,000.

—Styrene Acrylonitrile Copolymer—

The copolymerization ratio of styrene and acrylonitrile in the styrene acrylonitrile copolymer is not particularly limited. The styrene acrylonitrile copolymer contains a structural unit derived from styrene, for example, in an amount of 50% by mass to 95% by mass, 60% by mass to 90% by mass, or 70% by mass to 85% by mass.

The weight average molecular weight (Mw) of the styrene acrylonitrile copolymer is not particularly limited and is, for example, 15,000 to 120,000, more than 20,000 and 100,000 or less, 22,000 to 100,000, or 25,000 to 100,000.

As the resin (B), one type of resin may be used alone, two or more types of resins may be used in combination.

[Resin Particles (C)]

The resin particles (C) are preferably resin particles having higher affinity for the resin (B) than the resin (A). The fact that the resin particles (C) have higher affinity for the resin (B) than the resin (A) may be confirmed by the fact that the distribution of the resin particles (C) are biased toward the dispersed phases containing the resin (B) when the cross section of the resin composition is observed. The fact that the distribution of the resin particles (C) are biased toward the dispersed phases containing the resin (B) means that among all the resin particles (C) included in the 20 µm square image described above, the proportion of the number of the resin particles (C) of which one third or more of the outer periphery is in contact with the dispersed phases containing the resin (B) is more than 50% by number.

The type of the resin particle (C) is not limited and is selected according to the types of the resin (A) and the resin (B).

The resin particle (C) is preferably a resin particle having a core layer and a shell layer containing a polymer and covering the core layer (referred to as "core-shell resin particle" in the present disclosure). The core-shell resin particle has the core layer as the innermost layer and the shell layer as the outermost layer. In the core-shell resin particle, one or more other layers (for example, one to six other layers) may be provided between the core layer and the shell layer.

In the core-shell resin particle, the polymer contained in the shell layer is preferably a polymer having higher affinity for the resin (B) than the resin (A). The core-shell resin particle may be a resin particle having desired characteristics for improving or changing the characteristics of the resin molded article (for example, rubber particle whose elastic modulus shows a desired range of values).

An example of the core-shell resin particle includes a resin particle obtained by grafting and polymerizing the polymer contained in the core layer with the same type of the polymer or another type of the polymer to form a shell layer The core layer of the core-shell resin particle is for example, a rubber layer. Examples of the rubber layer include a layer of a (meth)acrylic rubber, a (meth)acrylic copolymer rubber, a silicone rubber, a styrene rubber, a conjugated diene rubber, an α-olefin rubber, a nitrile rubber, a urethane rubber, a polyester rubber, a polyimide rubber, and a copolymer rubber of two or more kinds of these rubbers. Among them, the rubber layer is preferably a layer of a (meth)acrylic rubber, a (meth)acrylic copolymer rubber, a silicone rubber, a styrene rubber, a conjugated diene rubber, an α-olefin rubber, and a copolymer rubber of two or more kinds of these rubbers. The rubber layer may be obtained by copolymerizing and crosslinking agents (such as divinylbenzene, allyl acrylate, butylene glycol diacrylate, or the like).

Examples of the (meth)acrylic rubber or the (meth)acrylic copolymer rubber include a polymer rubber obtained by polymerizing or copolymerizing an alkyl (meth)acrylate (for example, an alkyl (meth)acrylate having an alkyl chain with 1 to 8 carbon atoms, an alkyl (meth)acrylate having an alkyl chain with 1 to 4 carbon atoms, and an alkyl (meth)acrylate having an alkyl chain with 1 or 2 carbon atoms).

Examples of the silicone rubber include a rubber constituted by silicones (such as polydimethylsiloxane and polyphenylsiloxane).

Examples of the styrene rubber include a polymer rubber obtained by polymerizing styrenes (such as styrene and α-methylstyrene).

Examples of the conjugated diene rubber include a polymer rubber (such as polybutadiene and polyisoprene) obtained by polymerizing a conjugated diene (such as butadiene and isoprene).

Examples of the α-olefin rubber include a polymer rubber obtained by polymerizing α-olefins (ethylene, propylene, and 2-methylpropylene).

Examples of the copolymer rubber include a copolymer of an alkyl (meth)acrylate and silicones, a copolymer of a conjugated diene and styrenes, a copolymer of an alkyl (meth)acrylate, a conjugated diene and styrenes, and a copolymer of a conjugated diene, styrenes and divinylbenzene, Examples of the polymer contained in the shell layer of the core-shell resin particle include at least one selected from the group consisting of a polyester, an alkyl (meth)acrylate polymer, a copolymer containing 50% by mass or more of structural units derived from an alkyl (meth)acrylate, a polystyrene, a copolymer containing 50% by mass or more of structural units derived from a styrene, and a styrene acrylonitrile copolymer. The polymer contained in the shell layer is selected according to the types of resin (A) and the resin (B).

The polyester contained in the shell layer is, for example, a polymer of hydroxyalkanoate (hydroxyalkanoic acid), a polycondensate of a polyvalent carboxylic acid and a polyhydric alcohol, and a ring-opening polycondensate of cyclic lactam.

An example of the polyester is an aliphatic polyester resin. Examples of the aliphatic polyester include a polyhydroxyalkanoate, and a polycondensate of an aliphatic diol and an aliphatic carboxylic acid.

Examples of the polyhydroxyalkanoate include a homopolymer of a hydroxyalkanoic acid (such as lactic acid, 2-hydroxybutyric acid, 3-hydroxybutyric acid, 4-hydroxybutyric acid, 2-hydroxy-3-methylbutyric acid, 2-hydroxy-3,3-dimethylbutyric acid, 3-hydroxyvaleric acid, 4-hydroxyvaleric acid, 5-hydroxyvaleric acid, 3-hydroxyhexanoic acid, 2-hydroxyhexanoic acid, 2-hydroxyisohexanoic acid, 6-hydroxyhexanoic acid, 3-hydroxypropionic acid, 3-hydroxy-2,2-dimethylpropionic acid, 3-hydroxyhexanoic acid, and 2-hydroxy-n-octanoic acid), or a copolymer of two or more kinds of these hydroxyalkanoic acids.

Specific examples of the polyhydroxyalkanoate include a homopolymer of a branched hydroxyalkanoic acid having 2 to 4 carbon atoms, a homopolymer of a branched hydroxyalkanoic acid having 2 to 4 carbon atoms and a branched hydroxyalkanoic acid having 5 to 7 carbon atoms, a homopolymer of a branched hydroxyalkanoic acid having 3 carbon atoms (i.e., polylactic acid), and a homopolymer of 3-hydroxybutyric acid and 3-hydroxyhexanoic acid (i.e., polyhydroxybutyrate hexanoate). The number of carbon atoms of the hydroxyalkanoic acid is a number including the number of carbon atoms of the carboxy group.

Examples of the polylactic acid include a poly-L-lactic acid having L-lactic acid as a structural unit, a poly-D-lactic acid having D-lactic acid as a structural unit, a poly-DL-lactic acid having L-lactic acid and D-lactic acid as structural units, and a mixture thereof.

The alkyl (meth)acrylate polymer contained in the shell layer may be any one of polymers and copolymers of an alkyl acrylate, polymers and copolymers of an alkyl methacrylate, and copolymers of an alkyl acrylate and an alkyl methacrylate. Examples of the alkyl (meth)acrylate include an alkyl (meth)acrylate having an alkyl chain with 1 to 8 carbon atoms, an alkyl (meth)acrylate having an alkyl chain with 1 to 4 carbon atoms, and an alkyl (meth)acrylate having an alkyl chain with 1 or 2 carbon atoms. An example of the alkyl (meth)acrylate polymer include polymethyl methacrylate (PMMA).

The copolymer containing 50% by mass or more of structural units derived from an alkyl (meth)acrylate (acrylic copolymer) contained in the shell layer contains, for example, 50% by mass or more of a structural unit derived from an alkyl (meth)acrylate having an alkyl chain with 1 to 8 carbon atoms, a structural unit derived from an alkyl (meth)acrylate having an alkyl chain with 1 to 4 carbon atoms, or a structural unit derived from an alkyl (meth) acrylate having an alkyl chain with of 1 or 2 carbon atoms. The acrylic copolymer contains the structural unit derived from an alkyl (meth)acrylate preferably in an amount of 70% by mass or more, and more preferably 80% by mass or more.

The acrylic copolymer contains a structural unit derived from, for example, styrenes (for example, monomers having a styrene skeleton such as a styrene, alkyl-substituted styrenes (α-methylstyrene, 2-methylstyrene, 3-methylstyrene, 4-methylstyrene, 2-ethylstyrene, 3-ethylstyrene, 4-ethylstyrene, or the like), halogen-substituted styrenes (2-chlorostyrene, 3-chlorostyrene, 4-chlorostyrene, or the like), vinyl naphthalenes (2-vinyl naphthalene or the like), and hydroxystyrenes (4-ethenylphenol or the like)), and unsaturated dicarboxylic anhydrides (for example, monomers having an unsaturated dicarboxylic anhydride skeleton such as maleic anhydride, itaconic anhydride, glutaconic anhydride, citraconic anhydride, and aconitic anhydride) in a range of 50% by mass or less.

An example of the acrylic copolymer includes a styrene methyl methacrylate copolymer containing 50% by mass or more of structural units derived from methyl methacrylate. In the styrene methyl methacrylate copolymer, the structural unit derived from methyl methacrylate is preferably 50% by mass to 95% by mass, more preferably 60% by mass to 90% by mass, and still more preferably 70% by mass to 85% by mass.

The copolymer containing 50% by mass or more of structural units derived from a styrene contained in the shell layer ("styrene copolymer") contains a structural unit derived from a styrene preferably in an amount of 70% by mass or more, and more preferably 80% by mass or more. The structural unit derived from a styrene includes a structural unit derived from alkyl-substituted styrenes (such as α-methyl styrene, 2-methylstyrene, 3-methylstyrene, 4-methylstyrene, 2-ethylstyrene, 3-ethylstyrene, and 4-ethylstyrene) and a structural unit derived from halogen-substituted styrenes (such as 2-chlorostyrene, 3-chlorostyrene, and 4-chlorostyrene).

The styrene copolymer contains a structural unit derived from, for example, monomers having a styrene skeleton such as vinyl naphthalene (2-vinyl naphthalene or the like), and hydroxystyrenes (4-ethenyl phenol or the like), unsaturated dicarboxylic anhydrides (for example, monomers having an unsaturated dicarboxylic anhydride skeleton such as maleic anhydride, itaconic anhydride, glutaconic anhydride, citraconic anhydride, and aconitic anhydride), alkyl (meth) acrylates (for example, an alkyl (meth)acrylate having an alkyl chain with 1 to 8 carbon atoms, an alkyl (meth)acrylate having an alkyl chain with 1 to 4 carbon atoms, and an alkyl (meth)acrylate having an alkyl chain with 1 or 2 carbon atoms) in a range of 50% by mass or less.

An example of the styrene copolymer includes a styrene methyl methacrylate copolymer containing 50% by mass or more of structural units derived from styrene. In the styrene methyl methacrylate copolymer, the structural unit derived from styrene is preferably 50% by mass to 95% by mass, more preferably 60% by mass to 90% by mass, and still more preferably 70% by mass to 85% by mass.

The copolymerization ratio of styrene and acrylonitrile in the styrene acrylonitrile copolymer contained in the shell layer is not particularly limited. The styrene acrylonitrile copolymer contains a structural unit derived from styrene, for example, in an amount of 50% by mass to 95% by mass, 60% by mass to 90% by mass, or 70% by mass to 85% by mass.

More specific examples of the core-shell resin particle include core-shell resin particles of the following (i) to (iv).

(i) Core-shell resin particle obtained by grafting and polymerizing a styrene acrylonitrile copolymer to form a shell layer on a core layer containing a conjugated diene rubber (preferably polybutadiene).

Examples of a commercially available product thereof include "blender" (registered trademark) manufactured by Galata Chemicals, and "ELIX" manufactured by ELIX POLYMERS.

(ii) Core-shell resin particle obtained by grafting and polymerizing a styrene copolymer or an acrylic copolymer to form a shell layer on a core layer containing a conjugated diene rubber (preferably polybutadiene). Here, the styrene copolymer or acrylic copolymer preferably contains a structural unit derived from a styrene, and a structural unit derived from an alkyl (meth)acrylate having an alkyl chain with 1 to 8 carbon atoms (preferably methyl methacrylate).

Examples of a commercially available product thereof include "METABLEN" (registered trademark) manufactured by Mitsubishi Chemical Corporation, and "Kane Ace" (registered trademark) manufactured by Kaneka Corporation.

(iii) Core-shell resin particle obtained by grafting and polymerizing a polystyrene to form a shell layer on a core layer containing a conjugated diene rubber (preferably polybutadiene).

Examples of a commercially available product thereof include "METABLEN" (registered trademark) made by Mitsubishi Chemical Corporation, "Kane Ace" (registered trademark) manufactured by Kaneka Corporation, "Clearstrength" (registered trademark) made by Arkema, and "PARALOID" (registered trademark) made by Dow Chemical Japan.

(iv) Core-shell resin particle obtained by grafting and polymerizing an alkyl (meth)acrylate polymer (preferably polymethyl methacrylate) to form a shell layer on a core layer containing at least one of a (meth)acrylic rubber and a (meth)acrylic copolymer rubber.

Examples of a commercially available product thereof include "METABLEN" (registered trademark) manufactured by Mitsubishi Chemical Corporation, and "PARALOID" (registered trademark) made by Dow Chemical Japan.

An example of the resin particle (C) also includes a single-layer resin particle which is not a core-shell resin particle. The single-layer resin particle is, for example, a crosslinked polymer fine particle of the compound mentioned as the shell layer of the core-shell resin particle.

As the resin particle (C), one type of the resin particle may be used alone, two or more types of resin particles may be used in combination.

The average particle diameter of the resin particles (C) contained in the resin composition according to the exemplary embodiment is preferably 10 nm or more from the viewpoint of obtaining dispersibility with respect to the resin composition, and is preferably 400 nm or less from the viewpoint of preventing excessive growth of the dispersed phases. From these viewpoints, the average particle diameter of the resin particles (C) is more preferably 50 nm to 350 nm, and still more preferably 100 nm to 300 nm.

In the present disclosure, the average particle diameter of the resin particles (C) contained in the resin composition is determined by the following measurement method.

Measurement is performed using a laser diffraction particle size distribution measuring apparatus (LS13320: manufactured by Beckman Coulter, Inc.). Specifically, the resin particles (C) are dispersed in ion exchanged water so as to obtain a dispersion having a solid content concentration of 1% by mass, the dispersion is put in a cell until an appropriate density (display density value is from 40 to 45) is reached, and after 10 seconds, the concentration in the cell is stabilized and then measured. For the obtained particle size distribution, the cumulative distribution is drawn from the small diameter side for the volume with respect to the divided particle size range (channel), and the particle diameter at which the cumulation is 50% is defined as the average particle diameter.

[Combination of Resin (A), Resin (B) and Resin Particles (C)]

In a case where the resin (A) is a mixture of the cellulose acylate and the plasticizer (D):
  the resin (B) is preferably at least one selected from the group consisting of a polyester, an acrylic resin, a copolymer containing 50% by mass or more of structural units derived from an alkyl (meth)acrylate, a polystyrene, a copolymer containing 50% by mass or more of structural units derived from a styrene, and a styrene acrylonitrile copolymer; and
  the resin particles (C) are core-shell resin particles and the polymer contained in the shell layer is preferably at least one selected from the group consisting of a polyester, an alkyl (meth)acrylate polymer, a copolymer containing 50% by mass or more of structural units derived from an alkyl (meth)acrylate, a polystyrene, a copolymer containing 50% by mass or more of structural units derived from a styrene, and a styrene acrylonitrile copolymer.

Here, the mixture of the cellulose acylate and the plasticizer (D) is preferably a mixture of the cellulose acylate and a cardanol compound.

In a case where the resin (A) is a polyolefin:
  the resin (B) is preferably at least one selected from the group consisting of a polyester, an acrylic resin, a copolymer containing 50% by mass or more of structural units derived from an alkyl (meth)acrylate, a polystyrene, a copolymer containing 50% by mass or more of structural units derived from a styrene, and a styrene acrylonitrile copolymer; and
  the resin particles (C) are core-shell resin particles and the polymer contained in the shell layer is preferably at least one selected from the group consisting of a polyester, an alkyl (meth)acrylate polymer, a copolymer containing 50% by mass or more of structural units derived from an alkyl (meth)acrylate, a polystyrene, a copolymer containing 50% by mass or more of structural units derived from a styrene, and a styrene acrylonitrile copolymer.

In a case where the resin (A) is a polyamide:
  the resin (B) is preferably at least one selected from the group consisting of a polyester, an acrylic resin, a copolymer containing 50% by mass or more of structural units derived from an alkyl (meth)acrylate, a polystyrene, a copolymer containing 50% by mass or more of structural units derived from a styrene, and a styrene acrylonitrile copolymer; and
  the resin particles (C) are core-shell resin particles and the polymer contained in the shell layer is preferably at least one selected from the group consisting of a polyester, an alkyl (meth)acrylate polymer, a copolymer containing 50% by mass or more of structural units derived from an alkyl (meth)acrylate, a polystyrene, a copolymer containing 50% by mass or more of structural units derived from a styrene, and a styrene acrylonitrile copolymer.

[Content or Content Ratio of Resin (A), Resin (B) and Resin Particles (C)]

It is preferable that in the resin composition according to the exemplary embodiment, the content or content ratio (all on a mass basis) of each component is in the following range from the viewpoint of easily obtaining the effect of improving chemical crack resistance by the addition of the resin particles (C).

A content of the resin (A) in the resin composition according to the exemplary embodiment is preferably 50% by mass or more, more preferably 60% by mass or more, and still more preferably 65% by mass or more, based on the total amount of the resin composition.

In a case where the resin (A) in the exemplary embodiment is a mixture of the cellulose acylate and the plasticizer (D), a mixing ratio of the cellulose acylate to the plasticizer (D) (mass of cellulose acylate: mass of plasticizer (D)) is preferably 100:1 to 100:30, and more preferably 100:3 to 100:15.

A content ratio (B)/(A) of the resin (B) to the resin (A) in the resin composition according to the exemplary embodiment is preferably 0.05 or more and less than 0.5, and more preferably from 0.08 to 0.3.

A content ratio (B)/(C) of the resin (B) to the resin particles (C) in the resin composition according to the exemplary embodiment is preferably from 0.5 to 4, and more preferably from 0.8 to 3.

[Other Components]

The resin composition according to the exemplary embodiment may contain components other than the resin (A), the resin (B) and the resin particles (C).

Examples of other components include: a flame retardant, a compatibilizer, a releasing agent, a light fastness agent, a weathering agent, a colorant, a pigment, a modifier, a drip inhibitor, an antistatic agent, a hydrolysis inhibitor, a filler, a reinforcing agent (such as glass fiber, carbon fiber, talc, clay, mica, glass flake, milled glass, glass beads, crystalline silica, alumina, silicon nitride, aluminum nitride, and boron nitride), an acid acceptor for preventing acetic acid from releasing (oxides such as magnesium oxide and aluminum oxide; metal hydroxides such as magnesium hydroxide, calcium hydroxide, aluminum hydroxide and hydrotalcite; calcium carbonate; talc; or the like), a reactive trapping agent (such as an epoxy compound, an acid anhydride compound, and a carbodiimide).

The content of other components is preferably 0% by mass to 5% by mass based on the total amount of the resin composition. Here, "0% by mass" means not containing other components.

[Method For Producing Resin Composition]

Examples of the method for producing the resin composition according to the exemplary embodiment include a method in which the resin (A), the resin (B), the resin particles (C), and other components as required are melt-kneaded. Here, the melt-kneading method is not particularly limited, and examples thereof include a twin-screw extruder, a Henschel mixer, a Banbury mixer, a single screw extruder, a multi-screw extruder, a co-kneader.

<Resin Molded Article>

The resin molded article according to the first exemplary embodiment contains a resin (A), a resin (B) and resin particles (C), and has a continuous phase containing the resin (A) and dispersed phases containing the resin (B), and when a cross section along a flow direction of the resin in molding the resin molded article is observed, an area circle equivalent diameter $d_{80}$, which is an area circle equivalent diameter corresponding to 80% from a small diameter side in a number cumulative distribution of area circle equivalent diameters of the dispersed phases, is 600 nm or less.

The resin molded article according to the second exemplary embodiment contains a resin (A), a resin (B) and resin particles (C), and has a continuous phase containing the resin (A) and dispersed phases containing the resin (B), and when a cross section along a flow direction of the resin in molding the resin molded article is observed, a proportion of the dispersed phases covering the resin particles (C) with respect to the dispersed phases having an area circle equivalent diameter of 100 nm or more is 70% by number or more.

Hereinafter, matters common to the resin molded article according to the first exemplary embodiment and the resin molded article according to the second exemplary embodiment are generically described as the resin molded article according to the exemplary embodiment.

The resin molded article according to the exemplary embodiment has an island structure in which the dispersed phases containing the resin (B) are dispersed in the continuous phase containing the resin (A).

According to the resin molded article of the exemplary embodiment, the dispersed phases are dispersed in the continuous phase and chemical cracks are less likely to occur.

The resin molded article according to the first exemplary embodiment is characterized in that the dispersed phases containing the resin (B) are relatively small, and when the cross section along the flow direction of the resin in molding the resin molded article is observed, an area circle equivalent diameter $d_{80}$, which is an area circle equivalent diameter corresponding to 80% from a small diameter side in a number cumulative cumulative distribution of area circle equivalent diameters of the dispersed phases containing the resin (B), is 600 nm or less. When $d_{80}$ is larger than 600 nm, the chemical cracks may not be prevented. From the viewpoint of preventing the chemical cracks, $d_{80}$ in the resin molded article is 600 nm or less, preferably 500 nm or less, and more preferably 400 nm or less.

The resin molded article according to the second exemplary embodiment is characterized in that the dispersed phases containing the resin (B) tend to cover the resin particles (C), and when the cross section along the flow direction of the resin in molding the resin molded article is observed, a proportion of the dispersed phases covering the resin particles (C) in the dispersed phases containing the resin (B) and having an area circle equivalent diameter of 100 nm or more is 70% by number or more. When the proportion is 70% by number or more, excessively large dispersed phases are few, and the chemical cracks are prevented. When the proportion is less than 70% by number, the chemical cracks may not be prevented. From the viewpoint of preventing the chemical cracks, the proportion in the resin molded article is 70% by number or more, preferably 80% by number or more, and more preferably 90% by number or more.

The method of observing the form of the dispersed phases containing the resin (B) in the resin molded article according to the exemplary embodiment is the same as the method described for the resin composition according to the exemplary embodiment. However, the resin molded article is cut along the flow direction of the resin in molding the resin molded article (that is, cut parallel to the flow direction of the resin in molding the resin molded article) to obtain a thin sample.

From the viewpoint of further preventing the chemical cracks, it is preferable that the resin molded article according to the first exemplary embodiment is also the resin molded article according to the second exemplary embodiment. That is, it is preferable that the resin molded article according to the exemplary embodiment contains a resin (A), a resin (B), and resin particles (C), and has a continuous phase containing the resin (A) and dispersed phases containing the resin (B), and when the cross section along the flow direction of the resin in molding the resin molded article is observed, the area circle equivalent diameter $d_{80}$, which is an area circle equivalent diameter corresponding to 80% from the small diameter side in the number cumulative distribution of area circle equivalent diameters of the dispersed phases, is 600 nm or less and the proportion of the dispersed phases covering the resin particles (C) with respect to the dispersed phases having an area circle equivalent diameter of 100 nm or more is 70% by number or more.

It is preferable that in the resin molded article according to the exemplary embodiment, the average value of the area circle equivalent diameter of the dispersed phases covering the resin particles (C) in the dispersed phases containing the resin (B) and having an area circle equivalent diameter of 100 nm or more is 400 nm or less when the cross section along the flow direction of the resin in molding the resin molded article is observed. The smaller, the better.

It is preferable that in the resin molded article according to the exemplary embodiment, the average value of the area circle equivalent diameter of the dispersed phases not covering the resin particles (C) in the dispersed phases containing the resin (B) and having an area circle equivalent diameter of 100 nm or more is 250 nm or less in a case where the proportion of the dispersed phases covering the resin particles (C) in the dispersed phases containing the resin (B) and having an area circle equivalent diameter of 100 nm or more is less than 100% by number, when the cross section along the flow direction of the resin in molding the resin molded article is observed. The smaller, the better.

The form of the dispersed phases in the resin molded article according to the exemplary embodiment may be controlled based on the content ratio (B)/(C) of the resin (B) to the resin particles (C), the average particle diameter of the resin particles (C), the degree of affinity between the resin (B), the resin particles (C) and the molding temperature in producing the resin molded article, or the like.

The resin molded article according to the exemplary embodiment is a molded article using the resin composition according to the exemplary embodiment as a precursor. The specific exemplary embodiments and preferred exemplary embodiments of the resin (A), the resin (B), the resin particles (C) and other components contained in the resin molded article according to the exemplary embodiment are the same as the specific exemplary embodiments and preferred exemplary embodiments of the resin (A), the resin (B), the resin particles (C) and other components in the resin composition according to the exemplary embodiment.

The method for molding the resin molded article according to the exemplary embodiment is preferably injection molding from the viewpoint of obtaining a high degree of freedom of shape. Therefore, the resin molded article according to the exemplary embodiment is preferably an injection molded article obtained by injection molding, from the viewpoint of obtaining a high degree of freedom of shape.

The cylinder temperature during the injection molding of the resin molded article according to the exemplary embodiment is, for example, 160° C. to 280° C., and preferably 180° C. to 240° C. The mold temperature during the injection molding of the resin molded article according to the exemplary embodiment is, for example, 40° C. to 90° C., and more preferably 40° C. to 60° C.

The injection molding of the resin molded article according to the exemplary embodiment is performed, for example, by using commercial devices such as NEX 500 manufactured by NISSEI PLASTIC INDUSTRIAL CO., LTD., NEX 150 manufactured by NISSEI PLASTIC INDUSTRIAL, CO., LTD., NEX 7000 manufactured by NISSEI PLASTIC INDUSTRIAL CO., LTD., PNX 40 manufactured by NISSEI PLASTIC INDUSTRIAL CO., LTD., and SE50D manufactured by Sumitomo Heavy Industries, Ltd.

The molding method for obtaining the resin molded article according to the exemplary embodiment is not limited to the above injection molding, and extrusion molding, blow molding, hot press molding, calender molding, coating molding, cast molding, dipping molding, vacuum molding, transfer molding or the like may also be applied.

The resin molded article according to the exemplary embodiment is suitably used for applications such as electronic and electrical equipment, office equipment, household electric appliances, automotive interior materials, toys, containers, or the like. Specific applications of the resin molded article according to the exemplary embodiment include: casings of electronic/electric devices or household electric appliances; various parts of electronic/electric devices or home electric appliances; interior parts of automobiles; block assembled toys; plastic model kits; CD-ROM or DVD storage cases; dishware; beverage bottles; food trays; wrapping materials; films; sheets; or the like.

Examples

Hereinafter, the resin composition and the resin molded article according to the exemplary embodiment will be described in more detail by means of examples. Materials, amounts, ratios, processing procedures, or the like shown in the following examples may be appropriately changed without departing from the gist of the present disclosure. Therefore, the resin composition and the resin molded article according to the exemplary embodiment should not be interpreted restrictively by the following specific examples.

<Preparation of Each Material>

The following materials are prepared. The resin (B) is selected to improve the flexural modulus of the resin molded article containing the resin (A) as a main component.

[Resin (A)]

RA1: Japan Polypropylene "NovatechPP BC3L", polypropylene.

RA2: ARKEMA "Rilsan BMNO", PA11.

RA3: Eastman Chemical "CAP 482-20", cellulose acetate propionate, having a weight average degree of polymerization of 716, a degree of acetyl group substitution of 0.18 and a degree of propionyl group substitution of 2.49.

RA4: Hong Yan Chemical Industry "LGCELLULOSE CAP-482-0.5", cellulose acetate propionate, having a weight average degree of polymerization of 286, a degree of acetyl group substitution of 0.18 and a degree of propionyl group substitution of 2.72.

RA5: Eastman Chemical "CAB 171-15", cellulose acetate butyrate, having a weight average degree of polymerization of 754, a degree of acetyl group substitution of 2.07 and a degree of butyryl group substitution of 0.73.

RA6: Daicel "L20", cellulose diacetate, having a weight average degree of polymerization of 453.

RA3 satisfies the following (2), (3) and (4). RA4 satisfies the following (4). (2) When measured by the GPC method using tetrahydrofuran as a solvent, the weight average molecular weight (Mw) in terms of polystyrene is from 160,000 to 250,000, a ratio Mn/Mz of a number average molecular weight (Mn) in terms of polystyrene to a Z average molecular weight (Mz) in terms of polystyrene is from 0.14 to 0.21, and a ratio Mw/Mz of a weight average molecular weight (Mw) in terms of polystyrene to the Z average molecular weight (Mz) in terms of polystyrene is from 0.3 to 0.7. (3) When measured with a capillography at a condition of 230° C. according to ISO 11443:1995, a ratio $\eta1/\eta2$ of a viscosity $\eta1$ (Pa·s) at a shear rate of 1216 (/sec) to a viscosity $\eta2$ (Pa·s) at a shear rate of 121.6 (/sec) is from 0.1 to 0.3. (4) When a small square plate test piece (D11 test piece specified by JIS K7139:2009, 60 mm×60 mm, thickness 1 mm) obtained by injection molding of the CAP is allowed to stand in an atmosphere at a temperature of 65° C. and a relative humidity of 85% for 48 hours, both an expansion coefficient in an MD direction and an expansion coefficient in a TD direction are from 0.4% to 0.6%.

[Resin (B)]

RB1: PS Japan "HF 77", polystyrene.

RB2: Asahi Kasei "DELPET 720V", polymethyl methacrylate.

RB3: DENKA "TX-100S", styrene methyl methacrylate copolymer.

RB4: Nature Works "Ingeo Biopolymer 3001D", polylactic acid.

RB5: Toray "TOYOLAC A25C-300", styrene acrylonitrile copolymer.

[Resin Particles (C)]

PT1: Galata Chemicals (Artek) "Blendex 338", core-shell resin particle obtained by grafting and polymerizing "styrene acrylonitrile copolymer" to form a shell layer on "homopolymer of butadiene" to be a core layer, having an average primary particle diameter of 300 nm.

PT2: Mitsubishi Chemical "METABLEN W-600A", core-shell resin particle obtained by grafting and polymerizing "methyl methacrylate homopolymer rubber" to form a shell layer on "copolymer rubber of 2-ethylhexyl acrylate and n-butyl acrylate" to be a core layer, having an average primary particle diameter of 200 nm.

PT3: Mitsubishi Chemical "METABLEN C-223A", core-shell resin particle obtained by grafting and polymerizing "copolymer of styrene and methyl methacrylate" to form a shell layer on "homopolymer of butadiene" to be a core layer, having an average primary particle diameter of 300 nm.

PT4: Toyobo "TAFTIC F-167", crosslinked PMMA particle, having an average primary particle diameter of 300 nm. The above products are lyophilized and solid components thereof are used.

[Plasticizer (D)]

PL1: Cardolite "NX-2026", cardanol, having a molecular weight of 298 to 305.

PL2: Cardolite "Ultra LITE 2020J", hydroxyethylated cardanol, having a molecular weight of 343 to 349.
PL3: Cardolite "Ultra LITE 513", glycidyl ether of cardanol, having a molecular weight of 354 to 361.
PL4: DAIHACHI CHEMICAL INDUSTRY "Daifatty 101", an adipate ester-containing compound, having a molecular weight of 326 to 378.
PL5: Jungbunzlauer "CITROFOL AHII", acetyl 2-ethylhexyl citrate, having a molecular weight of 571.
PL6: Mitsubishi Chemical "JP120", glycol benzoate, having a molecular weight of 327.
PL7: ADEKA "ADK Cizer D-32", epoxidized fatty acid 2-ethylhexyl, having a molecular weight about of 420.
PL8: Sanwa Chemical "OED", vegetable fatty acid octyl ester, having a molecular weight about of 386.
PL9: ADEKA "ADK Cizer RS-1000", polyether ester compound, having a molecular weight about of 550.
PL10: NOF "UNIOX PKA-5008", polyethylene glycol allyl ether, having a molecular weight of about 450.
PL11: Toagosei "ARUFON UP-1021", acrylic resin, having a weight average molecular weight of 1600.

[Others]
CP1: NOF CORPORATION "MODIPER-A1100", main chain is polyethylene and side chain is graft copolymer of polystyrene.
CP2: NOF CORPORATION "MODIPER-A1401", main chain is polyethylene and side chain is graft copolymer of styrene acrylonitrile copolymer.

<Production of Resin Composition and Injection Molding of Resin Molded Article>

[Examples 1 to 37, Comparative Examples 1 to 36, and Reference Examples 1 to 3]

Kneading is performed with a twin-screw kneader (LTE 20-44, manufactured by Labtech Engineering) at the charged amounts and kneading temperatures shown in Tables 1 to 3 to obtain a pellet (resin composition). A small square plate test piece (type D12, 60 mm×60 mm, thickness 2 mm), an ISO multipurpose test piece (dumbbell shaped, measurement part dimensions: width 10 mm and thickness 4 mm) and a rectangular test piece (length 125 mm, width 13 mm, and thickness 1 mm) are molded with an injection molding machine (NEX 500I, manufactured by NISSEI PLASTIC INDUSTRIAL CO., LTD.) using the pellet at an injection peak pressure not exceeding 180 MPa and at the molding temperatures and the mold temperatures shown in Tables 1 to 3.

<Observation of Cross Section of Resin Composition>

The pellet is cut along the extrusion direction when the pellet is being produced. The cross section is imaged with a scanning transmission electron microscope (JEM-2100F, manufactured by JEOL Ltd.) and a scanning probe microscope (MultiMode 8, manufactured by Bruker Co.). Based on a 20 μm square image, the area circle equivalent diameter of the dispersed phases is measured. The value corresponding to 80% from the small diameter side in the number cumulative distribution of the area circle equivalent diameter of the dispersed phases is obtained. In addition, the proportion of dispersed phases covering the resin particles (C) with respect to the dispersed phases having an area circle equivalent diameter of 100 nm or more is obtained. The results are shown in Tables 1 to 3.

<Observation of Cross Section of Resin Molded Article>

For an inner part about 0.5 mm from the surface of the small square test piece in the thickness direction, a surface (surface having sides on the length direction and the width direction as two sides) along the flow direction (length direction of the test piece) of the resin when the test piece is molded is imaged with a scanning transmission electron microscope (JEM-2100F, manufactured by JEOL Ltd.) and a scanning probe microscope (MultiMode 8, manufactured by Bruker Co.). Based on a 20 μm square image, the area circle equivalent diameter of the dispersed phases is measured. The value corresponding to 80% from the small diameter side in the number cumulative distribution of the area circle equivalent diameter of the dispersed phases is obtained. In addition, the proportion of dispersed phases covering the resin particles (C) with respect to the dispersed phases having an area circle equivalent diameter of 100 nm or more is obtained. The results are shown in Tables 1 to 3.

<Performance Evaluation on Resin Molded Article>

[Flexural Modulus]

The ISO multipurpose test piece was installed in a universal test apparatus (Autograph AG-Xplus, manufactured by Shimadzu Corporation), and a bending test was performed according to the standard ISO 178:2010 to obtain the flexural modulus (MPa). The measured values are shown in Tables 1 to 3.

[Chemical Crack Resistance]

The rectangular test piece is set in a constant strain jig (in-house manufacture), constant strain (0.4% to 2.4% in increments of 0.2%) is given by a two-point bending method, and 100 μL of the following chemical DT1 or chemical DT2 is applied to the entire surface on the extension side. After 24 hours, the presence or absence of cracks is confirmed and the lowest strain value at which cracks occurred is used as an index of chemical crack resistance. The lowest strain values at which cracks occurred are shown in Tables 1 to 3. "Non" in Tables 1 to 3 indicates that cracks do not occur.

Chemical DT1: Bath Magiclean manufactured by Kao Corporation
Chemical DT2: Saint Paul manufactured by DAINIHON JOCHUGIKU Co., Ltd.

"F" in Tables 1 to 3 indicates that the dispersed phases may not be measured because the resin (B) forms a cylinder structure.

TABLE 1

| | Resin (A) | | Plasticizer (D) | | Resin (B) | | Resin particles (C) | | Others | | content ratio (B)/(C) | Kneading temperature ° C. |
|---|---|---|---|---|---|---|---|---|---|---|---|---|
| | Type | Part | Type | Part | Type | Part | Type | Part | Type | Part | | |
| Reference Example 1 | RA1 | 100 | | | | | | | | | — | 200 |
| Comparative Example 1 | RA1 | 100 | | | RB1 | 10 | | | CP1 | 1 | — | 200 |

TABLE 1-continued

| | | | | | | | | | | |
|---|---|---|---|---|---|---|---|---|---|---|
| Example 1 | RA1 | 100 | RB1 | 10 | PT1 | 10 | CP1 | 1 | 1 | 200 |
| Comparative Example 2 | RA1 | 100 | RB1 | 10 | PT2 | 10 | CP1 | 1 | 1 | 200 |
| Comparative Example 3 | RA1 | 100 | RB2 | 10 | | | CP2 | 1 | — | 200 |
| Example 2 | RA1 | 100 | RB2 | 10 | PT2 | 10 | CP2 | 1 | 1 | 200 |
| Comparative Example 4 | RA1 | 100 | RB2 | 10 | PT3 | 10 | CP2 | 1 | 1 | 200 |
| Comparative Example 5 | RA1 | 100 | RB4 | 10 | | | CP2 | 1 | — | 200 |
| Example 3 | RA1 | 100 | RB4 | 10 | PT2 | 10 | CP2 | 1 | 1 | 200 |
| Comparative Example 6 | RA1 | 100 | RB4 | 10 | PT3 | 10 | CP2 | 1 | 1 | 200 |
| Comparative Example 7 | RA1 | 100 | RB5 | 10 | | | CP2 | 1 | — | 200 |
| Example 4 | RA1 | 100 | RB5 | 10 | PT1 | 10 | CP2 | 1 | 1 | 200 |
| Example 5 | RA1 | 100 | RB5 | 10 | PT2 | 10 | CP2 | 1 | 1 | 200 |
| Example 6 | RA1 | 100 | RB5 | 10 | PT3 | 10 | CP2 | 1 | 1 | 200 |
| Reference Example 2 | RA2 | 100 | | | | | | | — | 240 |
| Comparative Example 8 | RA2 | 100 | RB4 | 10 | | | | | — | 240 |
| Example 7 | RA2 | 100 | RB4 | 10 | PT2 | 10 | | | 1 | 240 |
| Comparative Example 9 | RA2 | 100 | RB4 | 10 | PT3 | 10 | | | 1 | 240 |
| Comparative Example 10 | RA2 | 100 | RB1 | 10 | | | | | — | 240 |
| Example 8 | RA2 | 100 | RB1 | 10 | PT1 | 10 | | | 1 | 240 |
| Comparative Example 11 | RA2 | 100 | RB1 | 10 | PT2 | 10 | | | 1 | 240 |
| Comparative Example 12 | RA2 | 100 | RB2 | 10 | | | | | — | 240 |
| Example 9 | RA2 | 100 | RB2 | 10 | PT2 | 10 | | | 1 | 240 |
| Comparative Example 13 | RA2 | 100 | RB2 | 10 | PT3 | 10 | | | 1 | 240 |
| Comparative Example 14 | RA2 | 100 | RB5 | 10 | | | | | — | 240 |
| Example 10 | RA2 | 100 | RB5 | 10 | PT1 | 10 | | | 1 | 240 |
| Example 11 | RA2 | 100 | RB5 | 10 | PT2 | 10 | | | 1 | 240 |
| Example 12 | RA2 | 100 | RB5 | 10 | PT3 | 10 | | | 1 | 240 |

| | Molding temperature °C. | Molding temperature °C. | Dispersed phase of resin composition d80 nm | Dispersed phase of resin composition Covering proportion % by number | Dispersed phase of resin molded article d80 nm | Dispersed phase of resin molded article Covering proportion % by number | Resin molded article Elastic modulus MPa | Resin molded article Chemical crack DT1 | Resin molded article Chemical crack DT2 |
|---|---|---|---|---|---|---|---|---|---|
| Reference Example 1 | 200 | 40 | — | — | — | — | 1480 | Non | Non |
| Comparative Example 1 | 200 | 40 | F | 0 | 4800 | 0 | 2050 | 0.6 | 1.6 |
| Example 1 | 200 | 40 | 470 | 89 | 460 | 89 | 2000 | Non | Non |
| Comparative Example 2 | 200 | 40 | F | F | 4400 | 8 | 2000 | 0.6 | 1.6 |
| Comparative Example 3 | 200 | 40 | F | 0 | 4700 | 0 | 2070 | 0.6 | 1.6 |
| Example 2 | 200 | 40 | 400 | 87 | 380 | 88 | 2020 | Non | Non |
| Comparative Example 4 | 200 | 40 | F | F | 4200 | 10 | 2020 | 0.6 | 1.6 |
| Comparative Example 5 | 200 | 40 | F | 0 | 4700 | 0 | 2070 | 0.6 | 1.6 |
| Example 3 | 200 | 40 | 390 | 87 | 390 | 89 | 2010 | Non | Non |
| Comparative Example 6 | 200 | 40 | F | F | 4500 | 13 | 1980 | 0.6 | 1.6 |
| Comparative Example 7 | 200 | 40 | F | 0 | 4100 | 0 | 2080 | 0.8 | 2.0 |
| Example 4 | 200 | 40 | 480 | 88 | 450 | 90 | 2040 | Non | Non |
| Example 5 | 200 | 40 | 440 | 91 | 390 | 92 | 2020 | Non | Non |
| Example 6 | 200 | 40 | 480 | 89 | 470 | 89 | 2020 | Non | Non |
| Reference Example 2 | 240 | 60 | — | — | — | — | 1010 | Non | Non |
| Comparative Example 8 | 240 | 60 | F | 0 | 4700 | 0 | 1400 | 0.8 | 2.0 |
| Example 7 | 240 | 60 | 390 | 90 | 380 | 91 | 1380 | Non | Non |
| Comparative Example 9 | 240 | 60 | F | F | 4600 | 6 | 1340 | 0.8 | 2.0 |

TABLE 1-continued

| | | | | | | | | | | |
|---|---|---|---|---|---|---|---|---|---|---|
| Comparative Example 10 | 240 | 60 | F | 0 | 4700 | 0 | 1430 | 0.8 | 2.0 |
| Example 8 | 240 | 60 | 500 | 90 | 490 | 89 | 1360 | Non | Non |
| Comparative Example 11 | 240 | 60 | F | F | 4500 | 3 | 1330 | 0.8 | 2.0 |
| Comparative Example 12 | 240 | 60 | F | 0 | 4500 | 0 | 1450 | 0.8 | 2.0 |
| Example 9 | 240 | 60 | 400 | 92 | 380 | 92 | 1380 | Non | Non |
| Comparative Example 13 | 240 | 60 | F | F | 4500 | 4 | 1350 | 0.8 | 2.0 |
| Comparative Example 14 | 240 | 60 | F | 0 | 4600 | 0 | 1460 | 1.0 | 2.0 |
| Example 10 | 240 | 60 | 480 | 90 | 470 | 90 | 1350 | Non | Non |
| Example 11 | 240 | 60 | 400 | 87 | 390 | 88 | 1360 | Non | Non |
| Example 12 | 240 | 60 | 460 | 88 | 460 | 87 | 1330 | Non | Non |

TABLE 2

| | Resin (A) | | Plasticizer (D) | | Resin (B) | | | | Resin particles (C) | | Others | | content ratio | Kneading temperature |
|---|---|---|---|---|---|---|---|---|---|---|---|---|---|---|
| | Type | Part | Type | Part | Type | Part | Type | Part | Type | Part | Type | Part | (B)/(C) | ° C. |
| Reference Example 3 | RA3 | 100 | PL1 | 10 | | | | | | | | | — | 220 |
| Comparative Example 15 | RA3 | 100 | PL1 | 10 | RB1 | 10 | | | | | | | — | 220 |
| Example 13 | RA3 | 100 | PL1 | 10 | RB1 | 10 | | | PT1 | 10 | | | 1 | 220 |
| Comparative Example 16 | RA3 | 100 | PL1 | 10 | RB2 | 10 | | | | | | | — | 220 |
| Example 14 | RA3 | 100 | PL1 | 10 | RB2 | 10 | | | PT2 | 10 | | | 1 | 220 |
| Example 15 | RA3 | 100 | PL1 | 10 | RB2 | 10 | | | PT4 | 10 | | | 1 | 220 |
| Comparative Example 17 | RA3 | 100 | PL1 | 10 | RB2 | 5 | RB4 | 5 | | | | | — | 220 |
| Example 16 | RA3 | 100 | PL1 | 10 | RB2 | 5 | RB4 | 5 | PT2 | 10 | | | 1 | 220 |
| Comparative Example 18 | RA3 | 100 | PL1 | 10 | RB3 | 10 | | | | | | | — | 220 |
| Example 17 | RA3 | 100 | PL1 | 10 | RB3 | 10 | | | PT1 | 10 | | | 1 | 220 |
| Comparative Example 19 | RA3 | 100 | PL1 | 10 | RB3 | 10 | | | PT2 | 10 | | | 1 | 220 |
| Comparative Example 20 | RA3 | 100 | PL1 | 10 | RB4 | 10 | | | | | | | — | 220 |
| Example 18 | RA3 | 100 | PL1 | 10 | RB4 | 10 | | | PT2 | 10 | | | 1 | 220 |
| Comparative Example 21 | RA3 | 100 | PL1 | 10 | RB5 | 10 | | | | | | | — | 220 |
| Example 19 | RA3 | 100 | PL1 | 10 | RB5 | 10 | | | PT1 | 10 | | | 1 | 220 |
| Example 20 | RA3 | 100 | PL1 | 10 | RB2 | 12.5 | RB4 | 12.5 | PT2 | 10 | | | 2.5 | 220 |
| Example 21 | RA3 | 100 | PL1 | 10 | RB2 | 17.5 | RB4 | 17.5 | PT2 | 10 | | | 3.5 | 220 |
| Comparative Example 22 | RA3 | 100 | PL1 | 10 | RB2 | 22.5 | RB4 | 22.5 | PT2 | 10 | | | 4.5 | 220 |
| Example 22 | RA3 | 100 | PL1 | 10 | RB2 | 5 | RB4 | 5 | PT2 | 3 | | | 3.3 | 220 |
| Comparative Example 23 | RA3 | 100 | PL1 | 10 | RB2 | 5 | RB4 | 5 | PT2 | 2 | | | 5 | 220 |
| Example 23 | RA3 | 100 | PL1 | 10 | RB2 | 22.5 | RB4 | 22.5 | PT2 | 15 | | | 3 | 220 |
| Example 24 | RA3 | 100 | PL1 | 10 | RB2 | 22.5 | RB4 | 22.5 | PT2 | 18 | | | 2.5 | 220 |

| | Molding temperature | Molding temperature | Dispersed phase of resin composition | | Dispersed phase of resin molded article | | Resin molded article | Chemical crack | |
|---|---|---|---|---|---|---|---|---|---|
| | | | d80 | Covering proportion % by number | d80 | Covering proportion % by number | Elastic modulus | | |
| | ° C. | ° C. | nm | | nm | | MPa | DT1 | DT2 |
| Reference Example 3 | 220 | 40 | — | — | — | — | 1550 | 2.4 | Non |
| Comparative Example 15 | 220 | 40 | F | 0 | 3500 | 0 | 2080 | 0.6 | 1.8 |
| Example 13 | 220 | 40 | 490 | 86 | 480 | 86 | 2030 | 2.2 | Non |
| Comparative Example 16 | 220 | 40 | F | 0 | 2700 | 0 | 2100 | 1.0 | 2.0 |
| Example 14 | 220 | 40 | 370 | 92 | 320 | 93 | 2060 | 2.4 | Non |
| Example 15 | 220 | 40 | 570 | 74 | 550 | 75 | 2140 | 1.6 | 2.2 |

TABLE 2-continued

| | | | | | | | | | |
|---|---|---|---|---|---|---|---|---|---|
| Comparative Example 17 | 220 | 40 | F | 0 | 2600 | 0 | 2080 | 1.2 | 2.0 |
| Example 16 | 220 | 40 | 340 | 91 | 340 | 92 | 2060 | 2.4 | Non |
| Comparative Example 18 | 220 | 40 | F | 0 | 3200 | 0 | 2100 | 0.8 | 1.8 |
| Example 17 | 220 | 40 | 470 | 92 | 450 | 92 | 2020 | 2.2 | Non |
| Comparative Example 19 | 220 | 40 | F | 0 | 3000 | 8 | 2010 | 0.8 | 1.8 |
| Comparative Example 20 | 220 | 40 | F | 0 | 2300 | 0 | 2090 | 1.2 | 2.2 |
| Example 18 | 220 | 40 | 390 | 88 | 350 | 92 | 2070 | 2.4 | Non |
| Comparative Example 21 | 220 | 40 | F | 0 | 1800 | 0 | 2120 | 1.2 | 2.4 |
| Example 19 | 220 | 40 | 480 | 88 | 450 | 88 | 2100 | 2.2 | Non |
| Example 20 | 220 | 40 | 370 | 90 | 370 | 90 | 2180 | 2.4 | Non |
| Example 21 | 220 | 40 | 560 | 72 | 550 | 74 | 2250 | 1.8 | 2.4 |
| Comparative Example 22 | 220 | 40 | 2000 | 57 | 1500 | 60 | 2340 | 1.2 | 1.8 |
| Example 22 | 220 | 40 | 590 | 70 | 580 | 72 | 2090 | 1.6 | 2.4 |
| Comparative Example 23 | 220 | 40 | 1460 | 67 | 1200 | 67 | 2090 | 1.2 | 2.0 |
| Example 23 | 220 | 40 | 570 | 74 | 570 | 77 | 2300 | 1.6 | 2.2 |
| Example 24 | 220 | 40 | 480 | 87 | 460 | 88 | 2280 | 2.2 | Non |

TABLE 3

| | Resin (A) | | Plasticizer (D) | | Resin (B) | | Resin particles (C) | | Others | | content ratio (B)/(O) | Kneading temperature ° C. |
|---|---|---|---|---|---|---|---|---|---|---|---|---|
| | Type | Part | Type | Part | Type | Part | Type | Part | Type | Part | | |
| Comparative Example 24 | RA3 | 100 | PL2 | 10 | RB2 | 5 | RB4 | 5 | | | — | 220 |
| Example 25 | RA3 | 100 | PL2 | 10 | RB2 | 5 | RB4 | 5 | PT2 | 10 | 1 | 220 |
| Comparative Example 25 | RA3 | 100 | PL3 | 10 | RB2 | 5 | RB4 | 5 | | | — | 220 |
| Example 26 | RA3 | 100 | PL3 | 10 | RB2 | 5 | RB4 | 5 | PT2 | 10 | 1 | 220 |
| Comparative Example 26 | RA3 | 100 | PL4 | 10 | RB2 | 5 | RB4 | 5 | | | — | 220 |
| Example 27 | RA3 | 100 | PL4 | 10 | RB2 | 5 | RB4 | 5 | PT2 | 10 | 1 | 220 |
| Comparative Example 27 | RA3 | 100 | PL5 | 10 | RB2 | 5 | RB4 | 5 | | | — | 220 |
| Example 28 | RA3 | 100 | PL5 | 10 | RB2 | 5 | RB4 | 5 | PT2 | 10 | 1 | 220 |
| Comparative Example 28 | RA3 | 100 | PL6 | 10 | RB2 | 5 | RB4 | 5 | | | — | 220 |
| Example 29 | RA3 | 100 | PL6 | 10 | RB2 | 5 | RB4 | 5 | PT2 | 10 | 1 | 220 |
| Comparative Example 29 | RA3 | 100 | PL7 | 10 | RB2 | 5 | RB4 | S | | | — | 220 |
| Example 30 | RA3 | 100 | PL7 | 10 | RB2 | 5 | RB4 | 5 | PT2 | 10 | 1 | 220 |
| Comparative Example 30 | RA3 | 100 | PL8 | 10 | RB2 | 5 | RB4 | 5 | | | — | 220 |
| Example 31 | RA3 | 100 | PL8 | 10 | RB2 | 5 | RB4 | 5 | PT2 | 10 | 1 | 220 |
| Comparative Example 31 | RA3 | 100 | PL9 | 10 | RB2 | 5 | RB4 | 5 | | | — | 220 |
| Example 32 | RA3 | 100 | PL9 | 10 | RB2 | 5 | RB4 | 5 | PT2 | 10 | 1 | 220 |
| Comparative Example 32 | RA3 | 100 | PL10 | 10 | RB2 | 5 | RB4 | 5 | | | — | 220 |
| Example 33 | RA3 | 100 | PL10 | 10 | RB2 | 5 | RB4 | 5 | PT2 | 10 | 1 | 220 |
| Comparative Example 33 | RA3 | 100 | PL11 | 10 | RB2 | 5 | RB4 | 5 | | | — | 220 |
| Example 34 | RA3 | 100 | PL11 | 10 | RB2 | 5 | RB4 | 5 | PT2 | 10 | 1 | 220 |
| Comparative Example 34 | RA4 | 100 | PL1 | 10 | RB2 | 5 | RB4 | 5 | | | — | 220 |
| Example 35 | RA4 | 100 | PL1 | 10 | RB2 | 5 | RB4 | 5 | PT2 | 10 | 1 | 220 |
| Comparative Example 35 | RA5 | 100 | PL1 | 10 | RB2 | 5 | RB4 | 5 | | | — | 230 |
| Example 36 | RA5 | 100 | PL1 | 10 | RB2 | 5 | RB4 | 5 | PT2 | 10 | 1 | 230 |
| Comparative Example 36 | RA6 | 80 | PL4 | 20 | RB2 | 5 | RB4 | 5 | | | — | 230 |
| Example 37 | RA6 | 80 | PL4 | 20 | RB2 | 5 | RB4 | 5 | PT2 | 10 | 1 | 230 |

TABLE 3-continued

| | Molding temperature °C. | Molding temperature °C. | Dispersed phase of resin composiiton d80 nm | Covering proportion % by number | Dispersed phase of resin molded article d80 nm | Covering proportion % by number | Resin molded article Elastic modulus MPa | Chemical crack DT1 | Chemical crack DT2 |
|---|---|---|---|---|---|---|---|---|---|
| Comparative Example 24 | 220 | 40 | F | 0 | 2600 | 0 | 2090 | 1.4 | 2.0 |
| Example 25 | 220 | 40 | 370 | 90 | 350 | 93 | 2060 | 2.4 | Non |
| Comparative Example 25 | 220 | 40 | F | 0 | 2800 | 0 | 2120 | 1.2 | 2.0 |
| Example 26 | 220 | 40 | 370 | 91 | 370 | 91 | 2090 | 2.4 | Non |
| Comparative Example 26 | 220 | 40 | F | 0 | 2500 | 0 | 2100 | 1.4 | 1.8 |
| Example 27 | 220 | 40 | 360 | 90 | 340 | 92 | 2070 | 2.4 | Non |
| Comparative Example 27 | 220 | 40 | F | 0 | 2700 | 0 | 2110 | 1.4 | 2.0 |
| Example 28 | 220 | 40 | 390 | 87 | 390 | 90 | 2080 | 2.2 | Non |
| Comparative Example 28 | 220 | 40 | F | 0 | 2800 | 0 | 2120 | 1.4 | 2.0 |
| Example 29 | 220 | 40 | 390 | 92 | 370 | 92 | 2080 | 2.2 | Non |
| Comparative Example 29 | 220 | 40 | F | 0 | 2500 | 0 | 2080 | 1.4 | 1.8 |
| Example 30 | 220 | 40 | 370 | 90 | 370 | 92 | 2050 | 2.4 | Non |
| Comparative Example 30 | 220 | 40 | F | 0 | 2700 | 0 | 2080 | 1.4 | 1.8 |
| Example 31 | 220 | 40 | 400 | 91 | 400 | 90 | 2060 | 2.2 | Non |
| Comparative Example 31 | 220 | 40 | F | 0 | 2800 | 0 | 2100 | 1.4 | 2.0 |
| Example 32 | 220 | 40 | 400 | 89 | 380 | 91 | 2080 | 2.2 | Non |
| Comparative Example 32 | 220 | 40 | F | 0 | 2600 | 0 | 2080 | 1.4 | 2.0 |
| Example 33 | 220 | 40 | 360 | 92 | 350 | 92 | 2040 | 2.2 | Non |
| Comparative Example 33 | 220 | 40 | F | 0 | 2800 | 0 | 2130 | 1.4 | 1.8 |
| Example 34 | 220 | 40 | 560 | 77 | 560 | 75 | 2110 | 1.8 | 2.2 |
| Comparative Example 34 | 220 | 40 | F | 0 | 2700 | 0 | 2110 | 1.0 | 1.8 |
| Example 35 | 220 | 40 | 400 | 86 | 380 | 88 | 2080 | 2.2 | Non |
| Comparative Example 35 | 230 | 40 | F | 0 | 2900 | 0 | 2430 | 1.4 | 2.0 |
| Example 36 | 230 | 40 | 370 | 91 | 350 | 91 | 2360 | 2.4 | Non |
| Comparative Example 36 | 230 | 60 | F | 0 | 3800 | 0 | 2700 | 1.0 | 1.8 |
| Example 37 | 230 | 60 | 580 | 76 | 580 | 74 | 2680 | 1.6 | 2.4 |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising a resin (A), a resin (B), and resin particles (C), and having a continuous phase containing the resin (A) and dispersed phases containing the resin (B),
   wherein when a cross section of the resin composition along an extrusion direction in producing the resin composition is observed, a proportion of the dispersed phases covering the resin particles (C) with respect to the dispersed phases having an area circle equivalent diameter of 100 nm or more is 70% by number or more;
   wherein a content ratio (B)/(A) of the resin (B) to the resin (A) is 0.05 or more and less than 0.5;
   wherein the resin (A) contains a mixture of a cellulose acylate and a plasticizer (D), and
   wherein the plasticizer (D) contains at least one selected from the group consisting of a cardanol compound, a dicarboxylic acid diester, a citrate, a polyether compound having at least one unsaturated bond in a molecule, a polyether ester compound, a glycol benzoate ester, an ester compound represented by the following General Formula (ES1) and an epoxidized fatty acid ester,

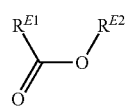

General Formula (ES1)

wherein, in the General Formula (ES1), $R^{E1}$ represents an aliphatic hydrocarbon group having 7 to 28 carbon atoms, and $R^{E2}$ represents an aliphatic hydrocarbon group having 1 to 8 carbon atoms.

2. The resin composition according to claim 1, wherein a content ratio (B)/(C) of the resin (B) to the resin particles (C) is from 0.5 to 4.

3. A resin molded article comprising the resin composition according to claim 1.

4. The resin composition according to claim 1, wherein the resin (B) contains at least one selected from the group consisting of a polyester, an acrylic resin, a copolymer containing 50% by mass or more of structural units derived from an alkyl (meth)acrylate, a polystyrene, a copolymer containing 50% by mass or more of structural units derived from a styrene, and a styrene acrylonitrile copolymer.

5. The resin composition according to claim 1, wherein an average particle diameter of the resin particles (C) is 10 nm to 400 nm.

6. The resin composition according to claim 1, wherein the resin particles (C) contain resin particles each having a core layer and a shell layer that contains a polymer and covers the core layer.

7. The resin composition according to claim 6, wherein and the polymer that covers the core layer contains resin particles being at least one selected from the group consisting of a polyester, an alkyl (meth)acrylate polymer, a copolymer containing 50% by mass or more of structural units derived from an alkyl (meth)acrylate, a polystyrene, a copolymer containing 50% by mass or more of structural units derived from a styrene, and a styrene acrylonitrile copolymer.

* * * * *